(12) United States Patent
Gao et al.

(10) Patent No.: US 9,014,020 B2
(45) Date of Patent: Apr. 21, 2015

(54) METHODS AND SYSTEMS OF WIRELESS COMMUNICATION WITH REMOTE RADIO HEADS

(75) Inventors: Shiwei Gao, Nepean (CA); Hua Xu, Ottawa (CA); Shiguang Guo, Ottawa (CA); Jack Anthony Smith, Valley View, TX (US); Yongkang Jia, Ottawa (CA); Masoud Ebrahimi Tazeh Mahalleh, Ottawa (CA); Dongsheng Yu, Ottawa (CA); Robert Mark Harrison, Grapevine, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 225 days.

(21) Appl. No.: 13/099,104

(22) Filed: May 2, 2011

(65) Prior Publication Data

US 2012/0281554 A1 Nov. 8, 2012

(51) Int. Cl.
| | | |
|---|---|---|
| H04J 1/16 | (2006.01) | |
| H04W 48/12 | (2009.01) | |
| H04L 5/00 | (2006.01) | |
| H04W 88/08 | (2009.01) | |
| H04W 48/08 | (2009.01) | |

(52) U.S. Cl.
CPC ............ *H04W 48/12* (2013.01); *H04W 88/085* (2013.01); *H04W 48/08* (2013.01); *H04L 5/0023* (2013.01); *H04L 5/0051* (2013.01); *H04L 5/0053* (2013.01); *H04L 5/0082* (2013.01); *H04L 5/0094* (2013.01)

(58) Field of Classification Search
None
See application file for complete search history.

(56) References Cited

U.S. PATENT DOCUMENTS

| 7,720,020 B2 | 5/2010 | Larsson |
|---|---|---|
| 8,305,987 B2 | 11/2012 | Fong et al. |
| 2008/0247478 A1 | 10/2008 | Lee et al. |
| 2009/0023451 A1 | 1/2009 | Pan et al. |
| 2009/0075586 A1 | 3/2009 | Li et al. |
| 2010/0085917 A1 | 4/2010 | Gorokhov et al. |
| 2010/0151874 A1 | 6/2010 | Cai et al. |
| 2010/0167743 A1 | 7/2010 | Palanki et al. |
| 2010/0238824 A1 | 9/2010 | Farajidana et al. |
| 2010/0322171 A1 | 12/2010 | Dekorsy et al. |

(Continued)

FOREIGN PATENT DOCUMENTS

| JP | WO2010106923 | * 9/2010 |
|---|---|---|
| WO | 2010106923 A1 | 9/2010 |

(Continued)

OTHER PUBLICATIONS

NTT Docomo et al., "CSI RS Configuration to Support 4 Tx MIMO UE in 8 Tx Network", (R1-110861, 3GPP TSG-RAN WG1 #64, Taipei, Taiwan, Feb. 21-25, 2011) as recited in Applicants' IDS.*

(Continued)

*Primary Examiner* — Chi H Pham
*Assistant Examiner* — Raul Rivas
(74) *Attorney, Agent, or Firm* — Conley Rose, P.C.; J. Robert Brown, Jr.

(57) ABSTRACT

A method for transmitting control information in a telecommunications cell is provided. The method includes a transmission point in the cell transmitting a unicast PDCCH intended only for a specific UE in the cell. The unicast PDCCH contains at least one resource element in each resource element group. The at least one resource element contains a UE-specific DMRS that can be used for decoding the unicast PDCCH without the cell-specific reference signal.

20 Claims, 13 Drawing Sheets

1210— transmission point in cell transmits unicast PDCCH intended only for specific UE in cell; unicast PDCCH contains at least one RE in each REG; at least one RE contains a UE-specific DMRS that can be used for decoding unicast PDCCH without cell-specific reference signal

(56) References Cited

U.S. PATENT DOCUMENTS

| | | |
|---|---|---|
| 2010/0323684 A1 | 12/2010 | Cai et al. |
| 2010/0323709 A1 | 12/2010 | Nam et al. |
| 2010/0323720 A1 | 12/2010 | Jen |
| 2011/0019776 A1 | 1/2011 | Zhang et al. |
| 2011/0034175 A1* | 2/2011 | Fong et al. .................. 455/450 |
| 2011/0034177 A1 | 2/2011 | Oh et al. |
| 2011/0041027 A1 | 2/2011 | Fong et al. |
| 2011/0194504 A1* | 8/2011 | Gorokhov et al. ............ 370/329 |
| 2011/0252139 A1 | 10/2011 | Bhattad et al. |
| 2011/0256828 A1 | 10/2011 | Hsu et al. |
| 2012/0033571 A1 | 2/2012 | Shimezawa et al. |
| 2012/0039290 A1 | 2/2012 | Vrzic et al. |
| 2012/0051319 A1* | 3/2012 | Kwon et al. .................. 370/329 |
| 2012/0052796 A1 | 3/2012 | Takano |
| 2012/0082087 A1 | 4/2012 | Takano |
| 2012/0106374 A1 | 5/2012 | Gaal et al. |
| 2012/0134275 A1 | 5/2012 | Choi et al. |
| 2012/0270535 A1 | 10/2012 | Chen et al. |
| 2013/0201912 A1 | 8/2013 | Sheng et al. |

FOREIGN PATENT DOCUMENTS

| | | |
|---|---|---|
| WO | 2010117240 A2 | 10/2010 |
| WO | 2011021852 A2 | 2/2011 |
| WO | 2011100672 A1 | 8/2011 |
| WO | 2011128013 A1 | 10/2011 |

OTHER PUBLICATIONS

Gao, Shiwei, et al., U.S. Appl. No. 13/099,107, filed May 2, 2011; Title: Methods and Systems of Wireless Communication With Remote Radio Heads.
Gao, Shiwei, et al., U.S. Appl. No. 13/169,856, filed Jun. 27, 2011; Title: Methods of PDCCH Capacity Enhancement in LTE Sytems.
Gao, Shiwei, et al., U.S. Appl. No. 13/198,391, filed Aug. 4, 2011; Title: Methods of PDCCH Capacity Enhancement in LTE Systems Based on a TP-Specific Reference Signal.
3GPP TS 36.213 V10.1.0; 3rd Generation Partnership Project; Technical Specification Goup Radio Access Network; Evolved Universal Terrestrail Radio Access (E-UTRA); Physical Layer Procedures; Release 10; Mar. 2011; 115 pages.
3GPP TS 36.211 V10.1.0; 3rd Generation Partnership Project; Technical Specification Group Radio Access Network; Evolved Universal Terrestrail Radio Access (E-UTRA); Physical Channels and Modulation; Release 10; Mar. 2011; 103 pages.
3GPP TSG-RAN WG1 #64; "Aspects on Distributed RRUs with Shared Cell-ID for Heterogenous Deployments;" R1-110649; Taipei, Taiwan; Feb. 21-25, 2011; 11 pages.
3GPP TSG RAN WG1 Meeting #64; "Discussion on Intra-cell CoMP Operation;" R1-110744; Taipei, Taiwan; Feb. 21-25, 2010; 4 pages.
3GPP TSG RAN WG1 Meeting #64; "Some Design Consideration for CoMP Scenario 4;" R1-110591; Taipei, Taiwan; Feb. 21-25, 2011; 4 pages.
3GPP TSG-RAN WG1 #64; "CoMP with Lower Tx Power RRH in Heterogeneous Network;" R1-110867; Taipei, Taiwan; Feb. 21-25, 2011; 8 pages.
3GPP TSG RAN WG1 Meeting #64; "Draft Report of 3GPP TSG RAN WG1 #63bis v0.1.0;" R1-11xxxx; Taipei, Taiwan; Feb. 21-25, 2011; 73 pages.
3GPP TSG RAN WG1 Meeting #65; "Draft Report of 3GPP TSG RAN WG1 #64 v0.1.0;" R1-11xxxx; Kobe, Japan; May 9-13, 2011; 77 pages.
"4G System Capacity Enhancement with Distributed RRHs—the Same Cell ID as the eNB;" Feb. 15, 2011; 11 pages.
Gao, Shiwei, et al., U.S. Appl. No. 13/452,423, filed Apr. 4, 2012; Title: Methods and Systems of Wireless Communication with Remote Radio Heads.
PCT International Search Report; Application No. PCT/CA2012/050277; Jul. 10, 2012; 3 pages.
PCT Written Opinion of the International Searching Authority; Application No. PCT/CA2012/050277; Jul. 10, 2012; 6 pages.
3GPP TSG RAN WG1 Meeting #64; "CSI RS Configuration to Support 4 Tx MIMO UE in 8 Tx Networks"; R1-110861; Taipei, Taiwan; Feb. 21-25, 2011; 5 pages.
3GPP TSG-RAN WG2 Meeting #73; "Consderation on CSI-RS Configuration"; R2-111555/R1-111156; Taipei; Feb. 21-25, 2011; 5 pages.
3GPP TSG RAN WG1 Meeting #65; "Downlink CSI Feedback for Low-Power Nodes"; R1-111662; Barcelona, Spain; May 9-13, 2011; 6 pages.
3GPP TSG-RAN WG1 #63bis; "Baseline Schemes and Focus of CoMP Studies"; R1-110461; Dublin, Ireland; Jan. 17-21, 2011; 2 pages.
3GPP TSG RAN WG1 Meeting #65; "PDCCH Enhacnement Considerations"; R1-111661; Spain, Barcelona; May 9-13, 2011; 4 pages.
PCT International Search Report; Application No. PCT/US2012/034514; Nov. 1, 2012; 4 pages.
PCT Written Opinion of the International Searching Authority; Application No. PCT/US2012/034514; Nov. 1, 2012; 4 pages.
PCT International Search Report; Application No. PCT/US2012/034524; Oct. 31, 2012; 4 pages.
PCT Written Opinion of the International Searching Authority; Application No. PCT/US2012/034524; Oct. 31, 2012; 6 pages.
PCT International Search Report; Application No. PCT/US2012/034530; Nov. 1, 2012; 5 pages.
PCT Written Opinion of the International Searching Authority; Application No. PCT/US2012/034530; Nov. 1, 2012; 5 pages.
PCT Search Report; Application No. PCT/US2012/035863; Nov. 28, 2012; 4 pages.
PCT Written Opinion of the International Searching Authority; Application No. PCT/US2012/035863; Nov. 28, 2012; 4 pages.
Office Action dated Mar. 6, 2013; U.S. Appl. No. 13/099,107, filed May 2, 2011; 29 pages.
Final Office Action dated Jun. 26, 2013; U.S. Appl. No. 13/099,107, filed May 2, 2011; 15 pages.
Office Action dated Jul. 8, 2013; U.S. Appl. No. 13/169,856, filed Jun. 27, 2011; 41 pages.
Office Action dated Aug. 2, 2013; U.S. Appl. No. 13/198,391, filed Aug. 4, 2011; 41 pages.
Office Action dated Oct. 10, 2013; U.S. Appl. No. 13/452,423, filed Apr. 20, 2012; 33 pages.
Office Action dated Sep. 18, 2013; U.S. Appl. No. 13/099,107, filed May 2, 2011; 13 pages.
Final Office Action dated Oct. 31, 2013; U.S. Appl. No. 13/169,856, filed Jun. 27, 2011; 20 pages.
Advisory Action dated Jan. 9, 2014; U.S. Appl. No. 13/169,856, filed Jun. 27, 2011; 3 pages.
Final Office Action dated Dec. 17, 2013; U.S. Appl. No. 13/198,391, filed Aug. 4, 2011; 26 pages.
TSG RAN WG4 Meeting #57; "Verification of the Enhanced Downlink MIMO"; R4-104271; Jacksonville, US; Nov. 15-19, 2010; 4 pages.
3GPP TSG RAN1 #66bis; "Downlink Reference Symbol Configuration for Release-11"; R1-113259; Zhuhai, China; Oct. 10-14, 2011; 3 pages.
3GPP TSG RAN WG1 #66bis; "Discussion on Multi-Point CSI Feedback for CoMP"; R1-113087; Zhuhai, China; Oct. 10-14, 2011; 5 pages.
Korean Office Action as Received in Co-pending Application No. 10-2013-7031441 on Sep. 26, 2014; 3 pages. (No English translation available).
European Extended Search Report; Application No. 12779788.4; Sep. 1, 2014; 10 pages.
Final Office Action dated May 9, 2014; U.S. Appl. No. 13/452,423, filed Apr. 20, 2012; 18 pages.
Advisory Action dated Jul. 18, 2014; U.S. Appl. No. 13/452,423, filed Apr. 20, 2012; 2 pages.

(56) References Cited

OTHER PUBLICATIONS

3GPP TSG RAN1 #55; "Common Reference Symbol Mapping/Signaling for 8 Transmit Antenna"; R1-084447; Prague, Czech Republic; Nov. 10-14, 2008; 6 pages.

TSG-RAN WG1 #60; "Reference Signals for R-PDCCH Demodulation"; R1-100974; San Francisco, USA; Feb. 22-26, 2010; 6 pages.

3GPP TSG-RAN WG1 #60; "DM-RS for R-PDCCH"; R1-101498; San Francisco, USA; Feb. 22-26, 2010; 6 pages.

Office Action dated Feb. 27, 2015; U.S. Appl. No. 13/452,423, filed Apr. 20, 2012; 17 pages.

European Extended Search Report; Application No. 12779888.2; Jan. 7, 2015; 16 pages.

* cited by examiner $REG\#:$ 0 1 2 3 4 5 6 7 8
$precoding\,vector:$ $\vec{w}_0$ $\vec{w}_1$ $\vec{w}_2$ $\vec{w}_3$ $\vec{w}_0$ $\vec{w}_1$ $\vec{w}_2$ $\vec{w}_3$ $\vec{w}_0$

|  | Non-zero transmission power CSI-RS configuration | Zero transmission power CSI-RS configurations |
|---|---|---|
| UE1 | CSI-RS-macro-eNB | CSI-RS-RRH1 |
|  |  | CSI-RS-RRH2 |
| UE2 | CSI-RS-RRH1 | CSI-RS-macro-eNB |
|  |  | CSI-RS-RRH2 |
| UE3 | CSI-RS-RRH2 | CSI-RS-macro-eNB |
|  |  | CSI-RS-RRH1 |
| ... |  |  |

Table 1

|  | Not zero transmission power CSI-RS configuration | Zero transmission power CSI-RS configurations | | |
|---|---|---|---|---|
|  |  | CSI-RS config | # of CSI-RS ports | CSI feedback |
| UE1 | CSI-RS-macro-eNB | CSI-RS-RRH1 | 2 | yes |
|  |  | CSI-RS-RRH2 | 2 | yes |
| UE2 | CSI-RS-RRH1 | CSI-RS-macro-eNB | 4 | yes |
|  |  | CSI-RS-RRH2 | 2 | no |
| UE3 | CSI-RS-RRH2 | CSI-RS-macro-eNB | 4 | yes |
|  |  | CSI-RS-RRH1 | 2 | no |
| ... |  |  |  |  |

Table 2

Figure 11

1210 — transmission point in cell transmits unicast PDCCH intended only for specific UE in cell; unicast PDCCH contains at least one RE in each REG; at least one RE contains a UE-specific DMRS that can be used for decoding unicast PDCCH without cell-specific reference signal

Figure 12

METHODS AND SYSTEMS OF WIRELESS COMMUNICATION WITH REMOTE RADIO HEADS

BACKGROUND

As used herein, the terms "user equipment" and "UE" might in some cases refer to mobile devices such as mobile telephones, personal digital assistants, handheld or laptop computers, and similar devices that have telecommunications capabilities. Such a UE might consist of a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component will be referred to herein as an eNB, but it should be understood that such a component is not necessarily an eNB.

LTE may be said to correspond to Third Generation Partnership Project (3GPP) Release 8 (Rel-8 or R8), Release 9 (Rel-9 or R9), and Release 10 (Rel-10 or R10), and possibly also to releases beyond Release 10, while LTE Advanced (LTE-A) may be said to correspond to Release 10 and possibly also to releases beyond Release 10. As used herein, the terms "legacy", "legacy UE", and the like might refer to signals, UEs, and/or other entities that comply with LTE Release 10 and/or earlier releases but do not comply with releases later than Release 10. The terms "advanced", "advanced UE", and the like might refer to signals, UEs, and/or other entities that comply with LTE Release 11 and/or later releases. While the discussion herein deals with LTE systems, the concepts are equally applicable to other wireless systems as well.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 11 contains tables with examples of UE CSI-RS configurations in a cell with one macro-eNB and two RRHs, according to an embodiment of the disclosure.

FIG. 12 illustrates a method for transmitting control information in a telecommunications cell, according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure deals with cells that include one or more remote radio heads in addition to an eNB. Implementations are provided whereby such cells can take advantage of the capabilities of advanced UEs while still allowing legacy UEs to operate in their traditional manner. Two problems in achieving this result are identified, and two solutions are provided for each problem.

The downlink (DL) and uplink (UL) data rates for a UE can be greatly improved when there is a good signal to interference and noise ratio (SINR) at the UE. This is typically achieved when a UE is close to an eNB. Much lower data rates are typically achieved for UEs that are far away from the eNB, i.e., at the cell edge, because of the lower SINR experienced at these UEs due to large propagation losses or high interference levels from adjacent cells, especially in a small cell scenario. Thus, depending on where a UE is located in a cell, different user experiences may be expected.

Figure 1:
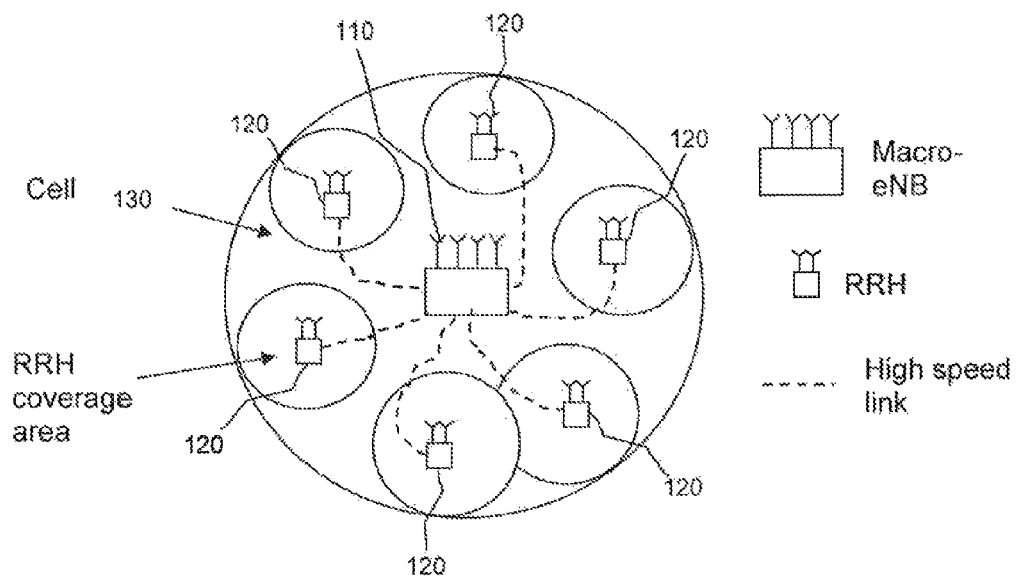
FIG. 1 is a diagram of an example of a remote radio head (RRH) deployment in a cell, according to an embodiment of the disclosure.

To provide a more consistent user experience, remote radio heads (RRH) with one, two or four antennas may be placed in the areas of a cell where the SINR from the eNB is low to provide better coverage for UEs in those areas. RRHs are sometimes referred to by other names such as remote radio units or remote antennas, and the term "RRH" as used herein should be understood as referring to any distributed radio device that functions as described herein. This type of RRH deployment has been under study in LTE for possible standardization in Release 11 or later releases. FIG. 1 shows an example of such a deployment with one eNB 110 and six RRHs 120, where the eNB 110 is located near the center of a cell 130 and the six RRHs 120 are spread in the cell 130 such as near the cell edge. An eNB that is deployed with a plurality of RRHs in this manner can be referred to as a macro-eNB. A cell is defined by the coverage of the macro-eNB, which may or may not be located at the center of a cell. The RRHs deployed may or may not be within the coverage of the macro-eNB. In general, the macro-eNB need not always have a collocated radio transceiver and can be considered as a device that exchanges data with and controls radio transceivers. The term transmission point (TP) may be used herein to refer to either a macro-eNB or an RRH. A macro-eNB or an RRH can be considered a TP with a number of antenna ports.

The RRHs 120 might be connected to the macro-eNB 110 via high capacity and low latency links, such as CPRI (common public radio interface) over optical fiber, to send and receive either digitized baseband signals or radio frequency (RF) signals to and from the macro-eNB 110. In addition to coverage enhancement, another benefit of the use of RRHs is an improvement in overall cell capacity. This is especially beneficial in hot-spots, where the UE density may be higher.

Figure 2:
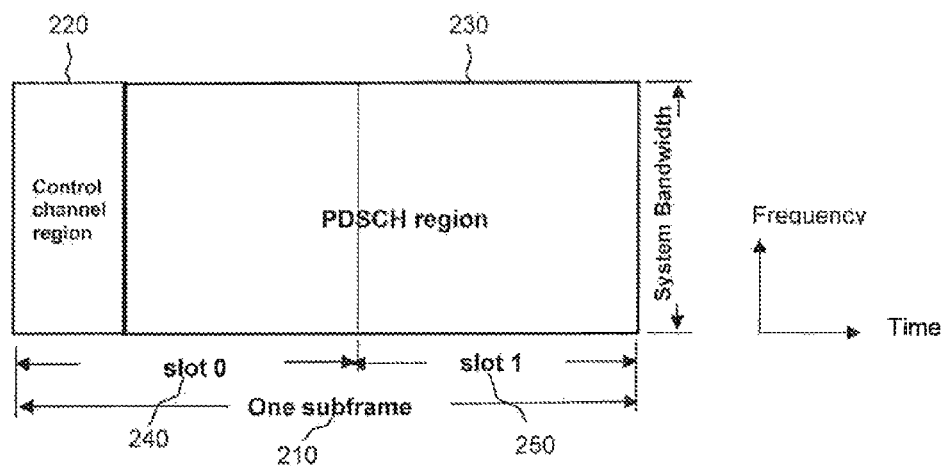
FIG. 2 is a diagram of a downlink LTE subframe, according to an embodiment of the disclosure.

FIG. 2 illustrates a typical DL LTE subframe 210. Control information such as the PCFICH (physical control format indicator channel), PHICH (physical HARQ (hybrid automatic repeat request) indicator channel), and PDCCH (physical downlink control channel) are transmitted in a control channel region 220. The PDSCH (physical downlink shared channel), PBCH (physical broadcast channel), PSC/SSC (primary synchronization channel/secondary synchronization channel), and CSI-RS (channel state information reference signal) are transmitted in a PDSCH region 230. Cell-specific reference signals (CRS) are transmitted over both regions. Each subframe 210 consists of a number of OFDM (orthogonal frequency division multiplexing) symbols in the time domain and a number of subcarriers in the frequency domain. An OFDM symbol in time and a subcarrier in frequency together define a resource element (RE). A physical resource block (RB) is defined as 12 consecutive subcarriers in the frequency domain and all the OFDM symbols in a slot in the time domain. An RB pair with the same RB index in slot 0 240 and slot 1 250 in a subframe are always allocated together.

Figure 3:
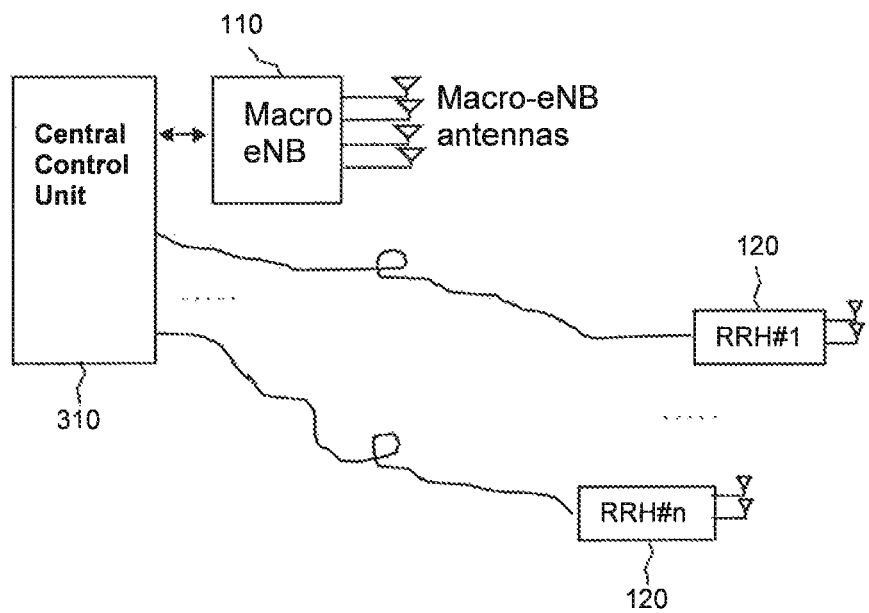
FIG. 3 is a block diagram of an RRH deployment with a separate central control unit for coordination between a macro-eNB and the RRHs, according to an embodiment of the disclosure.
Figure 4:
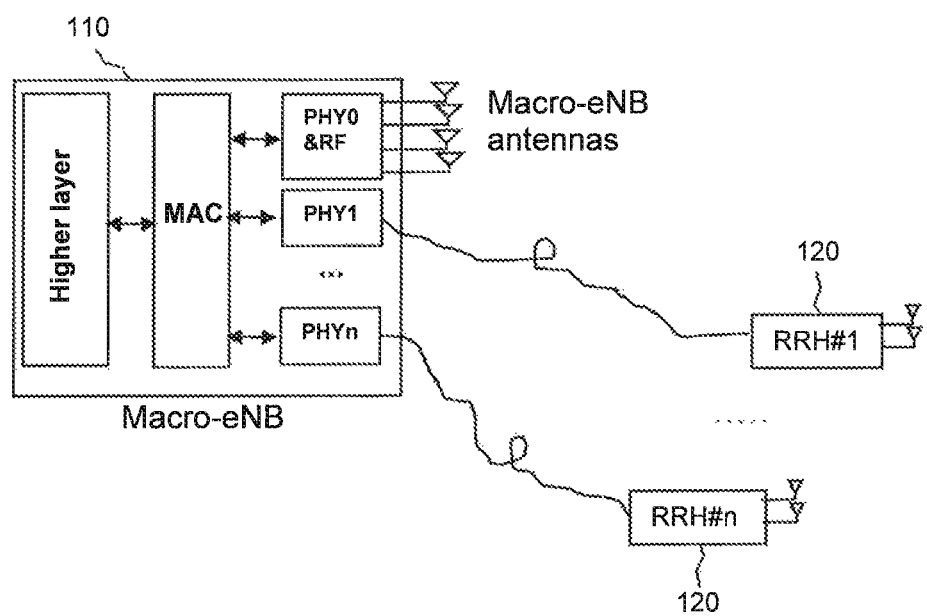
FIG. 4 is a block diagram of an RRH deployment where coordination is done by the macro-eNB, according to an embodiment of the disclosure.

When RRHs are deployed in a cell, there are at least two possible system implementations. In one implementation, as shown in FIG. 3, each RRH 120 may have built-in, full MAC (Medium Access Control) and PHY (Physical) layer functions, but the MAC and the PHY functions of all the RRHs 120 as well as the macro-eNB 110 may be controlled by a central control unit 310. The main function of the central control unit 310 is to perform coordination between the macro-eNB 110 and the RRHs 120 for DL and UL scheduling. In another implementation, as shown in FIG. 4, the functions of the central unit could be built into the macro-eNB 110. In this case, the PHY and MAC functions of each RRH 120 could also be combined into the macro-eNB 110. Either of the architectures may be implemented but, for discussion purposes, only the second architecture is assumed hereinafter. When the term "macro-eNB" is used hereinafter, it may refer to either a macro-eNB separate from a central control unit or a macro-eNB with built-in central control functions.

In a deployment of one or more RRHs in a cell with a macro-eNB, there are at least two possible operation scenarios. In a first scenario, each RRH is treated as an independent cell and thus has its own cell identifier (ID). From a UE's perspective, each RRH is equivalent to an eNB in this scenario. The normal hand-off procedure is required when a UE moves from one RRH to another RRH. In a second scenario, the RRHs are treated as part of the cell of the macro-eNB. That is, the macro-eNB and the RRHs have the same cell ID. One of the benefits of the second scenario is that the hand-off between the RRHs and the macro-eNB within the cell is transparent to a UE. Another potential benefit is that better coordination may be achieved to avoid interference among the RRHs and the macro-eNB.

These benefits may make the second scenario more desirable. However, some issues may arise regarding differences in how legacy UEs and advanced UEs might receive and use the reference signals that are transmitted in a cell. Specifically, a legacy reference signal known as the cell-specific reference signal (CRS) is broadcast throughout a cell by the macro-eNB and can be used by the UEs for channel estimation and demodulation of control and shared data. The RRHs also transmit a CRS that may be the same as or different from the CRS broadcast by the macro-eNB. Under the first scenario, each RRH would transmit a unique CRS that is different from and in addition to the CRS that is broadcast by the macro-eNB. Under the second scenario, the macro-eNB and all the RRHs would transmit the same CRS.

For the second scenario where all the RRHs deployed in a cell are assigned the same cell ID as the macro-eNB, several goals may be desirable. First, when a UE is close to one or more TPs, it may be desirable for the DL channels, such as the PDSCH and PDCCH, that are intended for that UE to be transmitted from that TP or those TPs. (The term "close to" a TP is used herein to indicate that a UE would have a better DL signal strength or quality if the DL signal is transmitted to that UE from that TP rather than from a different TP.) Receiving the DL channels from a nearby TP could result in better DL signal quality and thus a higher data rate and fewer resources used for the UE. Such transmissions could also result in reduced interference to the neighboring cells.

Second, it may be desirable for the same time/frequency resources for a UE served by one TP to be reused for other UEs close to different TPs when the interferences between the TPs are negligible. This would allow for increased spectrum efficiency and thus higher data capacity in the cell.

Third, in the case where a UE sees comparable DL signal levels from a plurality of TPs, it may be desirable for the DL channels intended for the UE to be transmitted jointly from the plurality of TPs in a coordinated fashion to provide a better diversity gain and thus improved signal quality.

Figure 5:
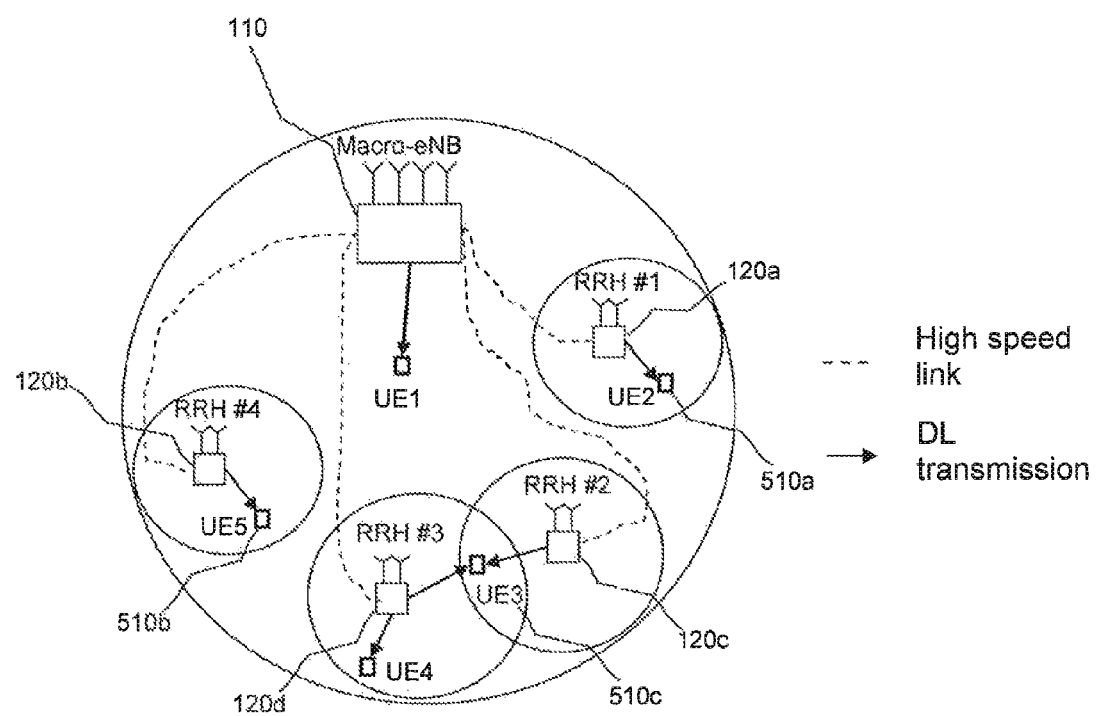
FIG. 5 is a diagram of an example of possible transmission schemes in a cell with RRHs, according to an embodiment of the disclosure.

An example of a mixed macro-eNB/RRH cell in which an attempt to achieve these goals might be implemented is illustrated in FIG. 5. It may be desirable for the DL channels for UE2 510a to be transmitted only from RRH#1 120a. Similarly, the DL channels to UE5 510b may be sent only from RRH#4 120b. In addition, it may be allowable for the same time/frequency resources used for UE2 510a to be reused by UE5 510b due to the large spatial separation of RRH #1 120a and RRH #4 120b. For UE3 510c, which is covered by both RRH#2 120c and RRH#3 120d, it may be desirable for the DL channels for the UE 510c to be transmitted jointly from both RRH#2 120c and RRH#3 120d such that the signals from the two RRHs 120c and 120d are constructively added at the UE 510c for improved signal quality.

To achieve these goals, UEs may need to be able to measure DL channel state information (CSI) for each individual TP or a set of TPs, depending on a macro-eNB request. For example, the macro-eNB 110 may need to know the DL CSI from RRH#1 120a to UE2 510a in order to transmit DL channels from RRH#1 120a to UE2 510a with proper precoding and proper modulation and coding schemes (MCS). Furthermore, to jointly transmit a DL channel from RRH#2 120c and RRH#3 120d to UE3 510c, an equivalent four-port DL CSI feedback for the two RRHs 120c and 120d from the UE 510c may be needed. However, these kinds of DL CSI feedback cannot be easily achieved with the Rel-8/9 CRS for one or more of the following reasons.

First, a CRS is transmitted on every subframe and on each antenna port. We define a CRS antenna port, alternatively a CRS port, to be the reference signal transmitted on a particular antenna port. Up to four antenna ports are supported, and the number of CRS antenna ports is indicated in the DL PBCH. CRSs are used by UEs in Rel-8/9 for DL CSI measurement and feedback, DL channel demodulation, and link quality monitoring. CRSs are also used by Rel-10 UEs for control channels such as PDCCH/PHICH demodulations and link quality monitoring. Thus, the number of CRS ports typically needs to be the same for all UEs. Thus, a UE is typically not able to measure and feed back DL channels for a subset of TPs in a cell based on the CRS.

Second, CRSs are used by Rel-8/9 UEs for demodulation of DL channels in certain transmission modes. Therefore, DL signals typically need to be transmitted on the same set of antenna ports as the CRS in these transmission modes. This implies that DL signals for Rel-8/9 UEs may need to be transmitted on the same set of antenna ports as the CRS.

Third, CRSs are also used by Rel-8/9/10 UEs for DL control channel demodulations. Thus, the control channels typically have to be transmitted on the same antenna ports as the CRS.

In Rel-10, channel state information reference signals (CSI-RS) are introduced for DL CSI measurement and feedback by Rel-10 UEs. CSI-RS is cell-specific in the sense that a single set of CSI-RS is transmitted in each cell. Muting is also introduced in Rel-10, in which the REs of a cell's PDSCH are not transmitted so that a UE can measure the DL CSI from neighbor cells.

In addition, UE-specific demodulation reference signals (DMRS) are introduced in the DL in Rel-10 for PDSCH demodulation without a CRS. With the DL DMRS, a UE can demodulate a DL data channel without knowledge of the antenna ports or the precoding matrix being used by the eNB for the transmission. A precoding matrix allows a signal to be transmitted over multiple antenna ports with different phase shifts and amplitudes.

Therefore, CRS reference signals are no longer required for a Rel-10 UE to perform CSI feedback and data demodulation. However, CRS reference signals are still required for control channel demodulation. This means that even for a UE-specific or unicast PDCCH, the PDCCH has to be transmitted on the same antenna ports as the CRS. Therefore, with the current PDCCH design, a PDCCH cannot be transmitted from only a TP close to a UE. Thus, it is not possible to reuse the time and frequency resources for the PDCCH. In addition, it is unclear how to measure and feed back DL CSI by a UE for a subset of TPs based on the CSI-RS.

Thus, at least three problems with the existing CRS have been identified. First, the CRS cannot be used for PDCCH demodulation if a PDCCH is transmitted from antenna ports that are different from the CRS ports. Second, the CRS is not adequate for CSI feedback of individual TP information when data transmissions to a UE are desired on a TP-specific basis for capacity enhancement. Third, the CRS is not adequate for joint CSI feedback for a group of TPs for joint PDSCH transmission.

Several solutions have previously been proposed to address these problems, but each proposal has one or more drawbacks. In one previous solution, the concept of a UE-specific reference signal (RS) was proposed for PDCCH/PHICH channels to enhance capacity and coverage of these channels by techniques such as CoMP (Coordinated Multi-Point), MU-MIMO (multi-user multiple-input/multiple-output) and beamforming. The use of a UE-specific RS for PDCCH/PHICH would enable area splitting gains also for the UE-specific control channels in a shared cell-ID deployment. One proposal was to reuse the R-PDCCH (relay PDCCH) design principles described in Rel-10 for relay nodes (RNs), in which a UE-specific RS is supported. The R-PDCCH was introduced in Rel-10 for sending scheduling information from the eNB to the RNs. Due to the half-duplex nature of an RN in each DL or UL direction, the PDCCH for an RN cannot be located in the legacy control channel region (the first few OFDM symbols in a subframe) and has to be located in the legacy PDSCH region in a subframe.

A drawback with the R-PDCCH structure is that the micro-sleep feature, in which a UE can turn off its receiver in a subframe after the first few OFDM symbols if it does not detect any PDCCH in the subframe, cannot be supported because an RN has to be active in the whole subframe in order to know whether there is a PDCCH for it. This may be acceptable for an RN because an RN is considered part of the infrastructure, and power saving is a lesser concern. In addition, only ⅛ of the DL subframes can be configured for eNB-to-RN transmission, so micro-sleep is less important to a RN. The micro-sleep feature is, however, important to a UE because micro-sleep helps to reduce the power consumption of a UE and thus can increase its battery life. In addition, a UE needs to check at every subframe for a possible PDCCH, making the micro-sleep feature additionally important to a UE. Thus, retaining the micro-sleep feature for UEs would be desirable in any new PDCCH design.

In another previous solution, to support individual DL CSI feedback, it was proposed that each TP should transmit the CSI-RS on a separate CSI-RS resource. The macro-eNB handling the joint operation of all the TPs within the macro-eNB's coverage area could then configure the CSI-RS resource that a particular UE should use when estimating the DL channel for CSI feedback. A UE sufficiently close to a TP would typically be configured to measure on the CSI-RS resource used by that TP. Different UEs would thus potentially measure on different CSI-RS resources depending on the location of the UE in the cell.

The set of transmission TPs from which a UE receives significant signals may differ from UE to UE. The CSI-RS measurement set thus may need to be configured in a UE-specific manner. It follows that the zero-power CSI-RS set also needs to support UE-specific configurations, since muting patterns need to be configured in relation to the resources used for the CSI-RS.

One of the limitations of this approach is that, although the allocation of zero and non-zero transmission power CSI-RS sets may be configured in a UE-specific manner to reflect the UE location differences in a cell, the same CSI-RS set needs to be configured for all UEs in a cell. This is because the CSI-RS resources on which PDSCH transmission is muted need to be the same on the macro-eNB and all other TPs in a cell in order to support joint transmissions between the macro-eNB and one or more RRHs. Thus, the REs allocated for the CSI-RS configurations, both zero and non-zero transmission power, need to be the same for all UEs in a cell. Otherwise, the CSI-RS configurations in a TP and a UE would be out of sync. As a result, the resource overhead for the CSI-RS could be high when a large number of TPs are deployed in a cell.

Another issue with this approach is that, based on the current Rel-10 signaling mechanism for CSI-RS configurations, a UE needs to measure and feed back either the DL CSI based on the "not zero" transmission power CSI-RS configuration or the DL CSIs based on both the not-zero and zero transmission power CSI-RS configurations. Although DL CSI feedback based on all the CSI-RS configurations to a UE may be needed in some cases, it may not always be desirable. For example, if a UE is close to only one or a few TPs, it may not be desirable to feed back CSIs for all the TPs in the cell, because the feedback overhead could be high. So it may be desirable to feed back CSIs for only the TPs that are close to a UE.

To restate the issues, in a first scenario, different IDs are used for the macro-eNB and the RRHs, and in a second scenario, the macro-eNB and the RRHs have the same ID. If the first scenario is deployed, the benefits of the second scenario described above could not be easily gained due to possible CRS and control channel interference between the macro-eNB and the RRHs. If these benefits are desired and the second scenario is selected, some accommodations may need to be made for the differences between the capabilities of legacy UEs and advanced UEs. A legacy UE performs channel estimation based on CRS for DL control channel (PDCCH) demodulation. A PDCCH intended for a legacy UE needs to be transmitted on the same TPs over which the CRS are transmitted. Since CRS are transmitted over all TPs, the PDCCH also needs be transmitted over all the TPs. A legacy Rel-8 or Rel-9 UE also depends on CRS for PDSCH demodulation. Thus a PDSCH for the UE needs to be transmitted on the same TPs as the CRS. For legacy Rel-10 UEs, although they do not depend on CRS for PDSCH demodulation, they may have difficulty in measuring and feeding back DL CSI for each individual TP, which is required for an eNB to send PDSCH over only the TPs close to the UEs. For an advanced UE, it may not depend on CRS for PDCCH demodulation. Thus the PDCCH for such a UE can be transmitted over only the TPs close to the UE. In addition, an advanced UE is able to measure and feedback DL CSI for each individual TP. Such capabilities of advanced UEs provide possibilities for cell operation that are not available with legacy UEs.

As an example, two advanced UEs that are widely separated in cell may each be near an RRH, and the coverage areas of the two RRHs may not overlap. Each UE might receive a PDCCH or PDSCH from its nearby RRH. Since each UE could demodulate its PDCCH or PDSCH without CRS, each UE could receive its PDCCH and PDSCH from its nearby RRH rather than from the macro-eNB. Since the two RRHs are widely separated, the same PDCCH and PDSCH time/frequency resources could be reused in the two RRHs, thus improving the overall cell spectrum efficiency. Such cell operation is not possible with legacy UEs.

As another example, a single advanced UE might be located in an area of overlapping coverage by two RRHs and could receive and properly process CRSs from each RRH. This would allow the advanced UE to communicate with both of the RRHs, and signal quality at the UE could be improved by constructive addition of the signals from the two RRHs.

Embodiments of the present disclosure deal with the second operation scenario where the macro-eNB and the RRHs have the same cell ID. Therefore, these embodiments can provide the benefits of transparent hand-offs and improved coordination that are available under the second scenario. In addition, these embodiments allow different TPs to transmit different CSI-RS in some circumstances. This can allow cells to take advantage of the ability of advanced UEs to distinguish between CSI-RS transmitted by different TPs, thus improving the efficiency of the cells. Further, these embodiments are backward compatible with legacy UEs in that a legacy UE could still receive the same CRS or CSI-RS anywhere in a cell as it has traditionally been required to do.

That is, embodiments of the present disclosure address the problems previously described while avoiding the drawbacks of the existing solutions. One set of embodiments deals with the problem of sending reference signals usable by advanced UEs over a subset of the RRHs in a cell while also broadcasting throughout the cell a CRS usable by legacy UEs. This problem and potential solutions to it will be described first. Another set of embodiments deals with the problem of how UEs can provide the macro-eNB with feedback on the quality of the downlink channel the UEs receive from one or more RRHs. This second problem and potential solutions to it will be described after the discussion of the first problem.

Two general solutions are provided herein for the first problem of sending dedicated reference signals usable by advanced UEs while broadcasting a CRS usable by legacy UEs. In the first solution to the first problem, a UE-specific, or unicast, PDCCH for an advanced UE is allocated in the control channel region in the same way a legacy PDCCH is allocated. However, for each resource element group (REG) allocated to a UE-specific PDCCH for an advanced UE, one or more of the REs not allocated for the CRS are replaced with a UE-specific DMRS symbol. The UE-specific DMRS is a sequence of complex symbols carrying a UE-specific bit sequence, and thus only the intended UE is able to decode the PDCCH correctly. Such DMRS sequences could be configured explicitly by higher layer signaling or implicitly derived from the user ID.

This UE-specific DMRS for PDCCH (UE-PDCCH-DMRS) would allow a PDCCH to be transmitted from either a single TP or multiple TPs to a UE. It also enables PDCCH transmission with more advanced techniques such as beamforming, MU-MIMO, and CoMP. In this solution, there is no change in multicast or broadcast PDCCH transmissions; they are transmitted in the common search space in the same way as in Rel-8/9/10. A UE could still decode the broadcast PDCCH using the CRS in the common search space. The UE-specific DMRS could be used to decode the unicast PDCCH.

This solution is fully backward compatible as it does not have any impact on the operation of legacy UEs. One drawback may be that there may be a resource overhead due to the UE-PDCCH-DMRS, but this overhead may be justified because fewer overall resources for the PDCCH may be needed when more advanced techniques are used.

More specifically, in this first solution to the first problem, the problem of PDCCH enhancement is solved by introducing a UE-specific PDCCH demodulation reference signal (UE-PDCCH-DMRS) for unicast PDCCH channels. The purpose of the UE-PDCCH-DMRS is to allow a UE to demodulate its PDCCH channels without the need of the CRS. By doing so, a unicast PDCCH channel to a UE could be transmitted over a TP or TPs that are close to the UE.

The resources allocated to a PDCCH can be one, two, four or eight control channel elements (CCEs) or aggregation levels, as specified in Rel-8. Each CCE consists of nine REGs. Each REG consists of four or six REs that are contiguous in the frequency domain and within the same OFDM symbol. Six REs are allocated for a REG only when there are two REs reserved for the CRS within the REG. Thus, effectively only four REs in a REG are available for carrying PDCCH data.

Figure 6:
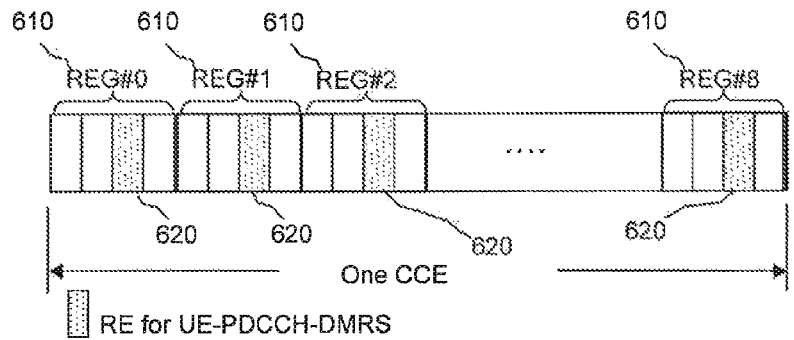
FIG. 6 is a conceptual diagram of a UE-PDCCH-DMRS allocation, according to an embodiment of the disclosure.

A UE-specific reference signal may be inserted into each REG by replacing one RE that is not reserved for the CRS. This is shown in FIG. 6, where four non-CRS REs are shown for each REG 610. Within each REG 610, out of the four non-CRS REs, one RE 620 is designated as an RE for UE-PDCCH-DMRS. The REGs within a CCE may not be adjacent in frequency due to REG interleaving defined in Rel-8/9/10. Thus, at least one reference signal is required for each REG 610 for channel estimation purposes. The location of the reference signal RE 620 within each REG 610 may be fixed or could vary from REG 610 to REG 610. Multiple reference signals within the REGs 610 could also be considered to improve performance.

A UE-specific reference signal sequence may be defined for the reference REs 620 within each CCE or over all the CCEs allocated for a PDCCH. The sequence could be derived from the 16-bit RNTI (radio network temporary identifier) assigned to a UE, the cell ID, and the subframe index. Thus, only the intended UE in a cell is able to estimate the DL channel correctly and decode the PDCCH successfully. Since a CCE consists of nine REGs, a sequence length of 18 bits may be defined for a CCE if quadrature phase shift keying (QPSK) modulation is used for each reference signal RE. A sequence length of a multiple of 18 bits may be defined for aggregation levels of more than one CCE.

A reference RE in each REG for the UE-PDCCH-DMRS means one less RE is available for carrying PDCCH data. This overhead may be justified because the use of UE-PDCCH-DMRS could allow a PDCCH to be transmitted from a TP close to the intended UE and thus enable better received signal quality at the UE. That, in turn, could lead to lower CCE aggregation levels and thus increased overall PDCCH capacity. In addition, higher order modulation may be applied to compensate for the reduced number of resources due to the UE-PDCCH-DMRS overhead.

Figure 7:
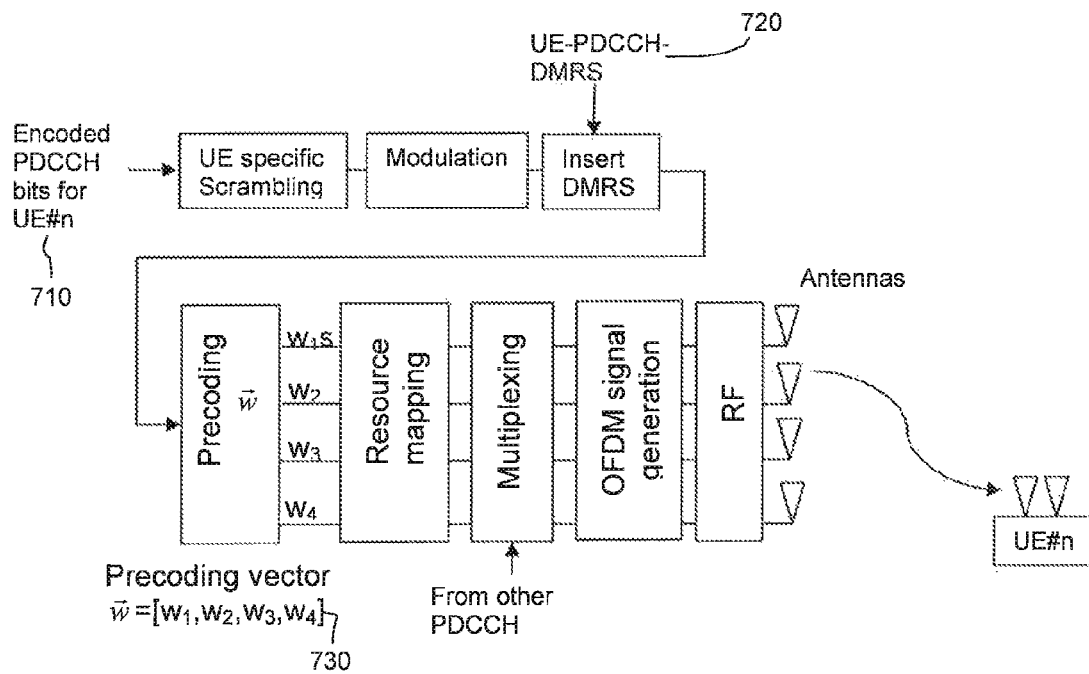
FIG. 7 is a diagram of an example of a pre-coded transmission of a PDCCH with UE-PDCCH-DMRS, according to an embodiment of the disclosure.

In addition, with the use of the UE-PDCCH-DMRS, a beamforming type of precoded PDCCH transmission can be used, in which a PDCCH signal is weighted and transmitted from multiple antenna ports of either a single TP or multiple TPs such that the signals are coherently combined at the intended UE. As a result, PDCCH detection performance improvement can be expected at the UE. Unlike in the CRS case where a unique reference signal is needed for each antenna port, the UE-PDCCH-DMRS can be precoded together with the PDCCH, and thus only one UE-PDCCH-DMRS is needed for a PDCCH channel regardless of the number of antenna ports used for the PDCCH transmission. Such a PDCCH transmission example is shown in FIG. 7, where the PDCCH channel 710 together with a UE-PDCCH-DMRS 720 is precoded with a coding vector $\vec{w}$ 730 before it is transmitted over the four antennas.

The precoding vector $\vec{w}$ 730 can be obtained from the DL wideband PMI (precoding matrix indicator) feedback from a UE configured in close loop transmission modes 4, 6 and 9 in LTE. It could be also obtained in the case where the PMI is estimated from a UL channel measurement based on channel reciprocity, such as in TDD (time division duplex) systems.

In situations where the DL PMI is not available or not reliable, a set of precoding vectors may be predefined, and each REG of a PDCCH may be precoded with one of the precoding vectors in the set. The mapping from precoding vector to REG can be done in a cyclic manner to maximize the diversity in both time and frequency. For example, if the predetermined set of precoding vectors are $\{\vec{w}_0, \vec{w}_1, \vec{w}_2, \vec{w}_3\}$ and one CCE is allocated to a PDCCH, then the mapping shown in FIG. 8 may be used. That is, precoding vectors $\vec{w}_0$, $\vec{w}_1, \vec{w}_2, \vec{w}_3$ are mapped to REGs 0, 1, 2, and 3, respectively, to REGs 4, 5, 6, and 7, respectively, and so on. In other embodiments, other mappings could be used. As the UE-PDCCH-DMRS is also precoded, the use of the precoding vector is transparent to a UE because the precoded UE-PDCCH-DMRS can be used by the UE for channel estimation and PDCCH data demodulation.

A UE could be semi-statically configured to decode the PDCCH in the UE-specific search space in LTE assuming that it will receive either a legacy PDCCH without the UE-PDCCH-DMRS, the new PDCCH with the UE-PDCCH-DMRS, or both.

In one scenario of system operation, the CRS could be transmitted over the antenna ports of both the macro-eNB and the RRHs. Returning to FIG. 5 as an example, four CRS ports could be configured. The corresponding four CRS signals {CRS0,CRS1,CRS2,CRS3} could be transmitted as follows: CRS0 could be transmitted over antenna port 0 of all the TPs. CRS1 could be transmitted over antenna port 1 of all the TPs. CRS2 could be transmitted on antenna port 2 of the macro-eNB 110. CRS3 could be transmitted on antenna port 3 of the macro-eNB 110. In other embodiments, the CRS signals could be transmitted in other ways.

A PDCCH intended for multiple UEs in a cell or for legacy UEs could be transmitted over the same antenna ports as the CRS by assuming four CRS ports. A PDCCH intended for UE2 510a may be transmitted with the UE-PDCCH-DMRS and over only RRH1 120a with two antenna ports. Similarly, a PDCCH intended for UE5 510b may be transmitted with the UE-PDCCH-DMRS over only RRH4 120b.

Since the PDCCHs are transmitted over the TPs that are close to the intended UEs, better signal quality can be expected and thus a higher coding rate can be used. As a result, a lower aggregation level (or a smaller number of CCEs) may be used. In addition, due to the large separation between RRH#1 120a and RRH#4 120b, the same PDCCH resource could be reused in these two RRHs, which doubles the PDCCH capacity.

For UE3 510c, which is covered by both RRH#2 120c and RRH#3 120d, a unicast PDCCH intended for UE3 510c may be transmitted jointly from both RRH#2 120c and RRH#3 120d to further enhance the PDCCH signal quality at the UE 510c.

As mentioned previously, two general solutions are provided herein for the first problem of sending reference signals usable by advanced UEs over a subset of the RRHs in a cell while also broadcasting throughout the cell a CRS usable by legacy UEs. The above discussion has dealt with the first solution, and the discussion now turns to the second solution. In this second solution, TP-specific reference signals for PDCCH demodulation are used to support PDCCH transmission over a single or multiple TPs. For transparency to legacy UEs, in an embodiment, the resources of legacy CRS port 2 and port 3 or a DMRS port are borrowed for transmitting TP-specific reference signals for PDCCH demodulation. These ports are then not configured for legacy UEs. A TP-specific sequence is used for the TP-specific reference signals. The presence of these TP-specific reference signals is signaled to the advanced UEs. These TP-specific reference signals could reuse the existing sequences defined for CRS and DMRS by replacing the cell ID with a TP ID. Alternatively, the sequences could be redefined in Rel-11. The benefit of this approach is that fewer resources are needed compared to the UE-PDCCH-DMRS. In addition, better averaging could be done for channel estimation.

More specifically, in this second solution to the first problem, instead of adding a new RS to construct a UE-specific DMRS for the PDCCH, the existing RS structures in LTE can be reused. In some embodiments, CRS ports 2 and 3 could be reused. In other embodiments, the DMRS ports could be reused.

In the embodiments where CRS ports 2 and 3 are used, the CRS can occupy the same REs and symbols and have the same randomization and other parameters as in Rel-8. However, CRS0 and CRS1 associated with one cell ID are transmitted on all TPs (including the macro-eNB), while each TP carries CRS2 and CRS3 associated with a distinct TP ID. The TP ID is used to replace the cell ID to configure the transmission of CRS2 and CRS 3, including the scrambling sequence, occupied REs, and other parameters, using legacy mechanisms. Because the TPs do not operate as cells in this solution, they do not have separate cell IDs. Legacy UEs can use CRS0 and CRS1 for channel estimation for PDCCH and for PDSCH transmission modes that use CRS0 and CRS1 as the phase reference. Because each TP has CRS2 and CRS3 with a distinct TP ID, advanced UEs can use CRS2 and CRS3 for PDCCH demodulation. It may also be possible to use CRS2 and CRS3 for PDSCH transmission modes that use two-port CRS as the phase reference, but the Rel-10 DMRS may be a better choice as a PDSCH phase reference.

Two approaches to transmitting the CRS can be considered, corresponding to when legacy UEs are informed that there are two or four antenna ports in the cell. If legacy UEs assume there are four antenna ports, then they will assume that all downlink control channels use four antenna ports. This would prevent a UE's PDCCH from being able to be transmitted in a TP-specific way, so this operation may be ruled out.

If legacy UEs assume that two antenna ports are used, REs corresponding to CRS2 and CRS3 are data REs, and the legacy UEs will decode the PDSCH or PDCCH using these REs. If these REs are punctured with the CRS, then the performance will degrade in proportion to the amount of puncturing. The impact of the puncturing on the PDCCH will be considered first and then the impact on the PDSCH will be considered.

In the case of the PDCCH, if the control region is one symbol long, there will be no control puncturing, since CRS2 and CRS3 are only in the second OFDM symbol of the control region. For a two-symbol control region, since four REs per RB would be punctured in the second OFDM symbol, each bit has a 4/(2*12)=⅙~=17% average chance of being punctured. Similarly, if there are three control symbols, each bit has a 4/(3*12)=⅑~=11% average chance of being punctured.

The impact on the PDSCH will be smaller than that on the PDCCH, since the RS density per subframe for CRS2 and CRS3 is 8/(14*12)~=4.7% Furthermore, the better link adaptation and availability of HARQ for the PDSCH should make the puncturing less harmful than for the PDCCH.

Instead of puncturing the legacy PDCCH or PDSCH, these channels' REs could carry data in regions where legacy UEs are scheduled. Considering the PDCCH, due to REG interleaving and UE search space randomization, each UE's PDCCH is distributed across the entire carrier bandwidth and occupies a random location within the PDCCH region. Therefore, it may be difficult for advanced UEs to do channel estimation using CRS2 and CRS3 if they are punctured by a legacy UE's PDCCH data in a dynamic way.

Considering the PDSCH, puncturing CRS2 and CRS3 with legacy PDSCH data would eliminate some or all of these two CRS ports' REs in OFDM symbol 8. When localized virtual resource blocks (VRBs) are used, it is possible to puncture only part of the CRSs in a semi-static way and therefore still allow advanced UEs to straightforwardly use the non-punctured REs for channel estimation. Furthermore, this semi-static pattern could vary in time, such that the full band could be estimated. Distributed VRBs may also be possible, but this may not be as straightforward.

If legacy channel puncturing is used, puncturing only the PDSCH with CRS ports 2 and 3 in OFDM symbol 8 might have a lesser impact on legacy PDSCH performance. However, having only one symbol containing CRS ports 2 and 3 would halve the maximum speed that could be supported for TP-specific PDCCHs and may reduce the amount of power that could be used for these antenna ports. Furthermore, advanced UEs might always have to use OFDM symbol 8 for channel estimation for PDCCH, somewhat reducing any potential benefits of micro-sleep. One way to mitigate this problem is to only schedule UEs that are frequently receiving or transmitting on the UE-specific PDCCHs. On the other hand, especially if it is preferable to maximize the benefit of micro-sleep, at least OFDM symbol 1 could be punctured with CRS ports 2 and 3.

In other embodiments, instead of using CRS ports 2 and 3 to transmit a TP-specific PDCCH reference signal, a DMRS port could be reused. A benefit of using a DMRS port for a TP-specific reference signal relative to using CRS ports 2 and 3 is the fact that, except for narrow system bandwidths, using a DMRS port will not puncture a legacy UEs' PDCCH, since they are in the PDSCH region. Also, there are more DMRS REs than for CRS ports 2 and 3, which can allow better channel estimation.

However, using a DMRS port for a TP-specific reference signal relative to CRS ports 2 and 3 might have some drawbacks. First, because the DMRSs are, for example, in symbols 3, 6, 9, and 12 for transmission mode 7, the UE must wake up for one or more of these symbols to measure the DMRS, thus disturbing the TDM (time division multiplexing) behavior of reading the PDCCH. Second, there are more REs for CRS ports 2 and 3 per OFDM symbol than for the DMRS. Therefore, if a UE wakes up to receive one or two symbols containing the DMRS, the UE will have a lower quality channel estimate than if CRS ports 2 and 3 were used. Third, a UE cannot be configured to receive the PDSCH using the DMRS antenna ports occupied by a TP-specific reference signal while receiving a TP-specific PDCCH. This may be acceptable, since the Rel-10 reference signals are likely to be used for PDSCH transmission and CSI estimation.

It can be seen that either CRS ports 2 and 3 or the DMRS antenna ports could be reused. An advantage of using the CRS ports may be the potential for maintaining the advantages of the TDM multiplexing of the PDCCH and PDSCH. This advantage is greater if the legacy UEs' PDCCHs can be punctured by the CRS. Advantages of using the DMRS are that it does not degrade PDCCH reception and it has a higher reference signal density per RB. So, if PDCCH puncturing is feasible and there is sufficient reference signal density for good channel estimation, using CRS may be preferred. Otherwise, DMRS may be preferred.

Regardless of whether CRS ports 2 and 3 or the DMRS antenna ports are reused, there are advantages and disadvantages to this TP-specific PDCCH-DMRS approach. Among the advantages, a TP-specific RS makes higher quality channel estimates possible by averaging across time and frequency. Also, channel estimation requires little modification from Rel-8 principles. In addition, if CRS ports 2 and 3 are used, two-port transmit diversity is straightforwardly supported. Further, channel estimates of a TP are available and can be used for management of RRH configuration, pathloss measurement for uplink loop power control, etc.

However, a TP-specific reference signal might make beamforming or precoding difficult to apply. Also, a TP-specific reference signal might be less flexible. That is, advanced UEs' PDCCHs might only be transmitted from one of two groups of TPs (configured with CRS0/1 or CRS2/3), and these groups might change slowly. In addition, transmission modes based on four-port CRS cannot be used for Rel-8/9 UEs.

The above discussion has dealt with two possible solutions to the first problem. The discussion now turns to a set of embodiments that deal with the second problem of how UEs can provide the macro-eNB with feedback on the quality of the downlink channel the UEs receive from one or more RRHs.

Two general solutions are provided herein for this second problem. In the first solution, UE-specific DL sounding reference signals (UE-DL-SRS) are provided for DL CSI measurement and feedback for individual TPs or jointly for multiple TPs. The benefit of this approach is that the presence of TPs in a cell is transparent to a UE. The macro-eNB can request a UE to feed back DL CSI with a preconfigured UE-DL-SRS and transmit the corresponding UE-DL-SRS over the desired TP or TPs. There is no hand-off issue because the macro-eNB can dynamically schedule and transmit a DL signal to a UE from a TP or TPs close to the UE based on the DL CSI feedback information. This approach treats the TPs in a cell as distributed antennas and allows the macro-eNB to transmit DL signals to a UE over a selected number of antenna ports. These UE-specific reference signals for CSI feedback can be configured independently from the UE-specific or TP-specific reference signals for the PDCCH as described with respect to the first problem since these signals address a different problem.

In other words, a UE-specific SRS is assigned to a UE by the macro-eNB when the UE connects to the macro-eNB's cell. A TP might transmit the UE-specific SRS to the UE upon the TP being prompted to do so by the macro-eNB and might do so without prompting. The UE measures the UE-specific SRS and uses the measurement to determine downlink channel information about the link between the TP and the UE. The UE then feeds this information back to the macro-eNB. The macro-eNB stores such information for all the UEs and TPs in its cell and thereby is aware of the quality of the downlink channels from each TP to each UE. The macro-eNB can use this information to determine the best TPs for DL data transmissions to a UE and to specify the modulation and coding schemes that are used for the transmissions.

More specifically, in this first solution to the second problem, to facilitate flexible DL CSI feedback about an individual TP or a group of TPs in a cell, a UE-specific DL sounding reference signal (UE-DL-SRS) is introduced. The UE-DL-SRS is a sequence of complex symbols to be transmitted over an antenna port to a UE for DL CSI measurement for the port. Multiple orthogonal sequences, one for each antenna port, may be transmitted over multiple antenna ports to a UE in a code-division multiplexing (CDM) fashion for DL CSI measurement for the antenna ports. UE-DL-SRSs for different UEs may be multiplexed in either CDM or FDM (frequency division multiplexing) in the same subframe or in TDM in different subframes.

A UE may be configured semi-statically with a single set or multiple sets of UE-DL-SRS configurations. Each set of UE-DL-SRS configurations may contain the number of UE-CSI-RS ports and the corresponding resources in the time, frequency and code domains.

The UE-DL-SRS may be transmitted periodically and/or aperiodically to a UE from a single TP or multiple TPs. In the case of periodic transmission of the UE-DL-SRS, the same UE-DL-SRS signals are transmitted to a UE periodically on the same set of antenna ports. The periodicity and subframe offset may be semi-statically configured.

In the case of an aperiodic UE-DL-SRS, a CSI feedback request may be sent to a UE in a UL grant on a PDCCH channel and may be followed by transmission of the UE-DL-SRS to the UE. The subframe in which the UE-DL-SRS is transmitted may be either the same subframe as the one carrying the CSI request or a subsequent subframe after the CSI feedback request. The UE estimates the DL CSI based on the received UE-DL-SRS and reports back the estimated CSI over the scheduled PUSCH (physical uplink shared channel) by the same UL grant. The aperiodic UE-CSI-RS can be used to dynamically feed back DL CSI information about a single TP or multiple TPs from a UE.

There may be at least two applications of the UE-DL-SRS based DL CSI measurement and feedback. In the first application, the DL CSI for each of the TPs that may be used for DL transmission to a UE can be measured and fed back individually. The DL CSI can be in the form of a PMI (precoding matrix indicator), a CQI (channel quality indicator), and an RI (rank indicator) as in the existing LTE Rel-8/9/10.

In the second application, multiple TPs can be considered together as a single transmitter with multiple distributed antennas. In this case, the DL CSI is calculated jointly with a single CSI feedback from the UE. The CSI calculation is based on a total number of antenna ports of the TPs. For example, if the feedback is for two TPs each with two antenna ports, then the CSI calculation would be based on four-port transmission. As long as the TPs are well synchronized and the total number of antenna ports is not more than eight (as specified in LTE Rel-10), the CSI calculation and feedback mechanism of Rel-10 can be reused. With this method, joint transmission from more than one TP on the same resources becomes possible with the same UL overhead as in Rel-10. The TPs can be transparent to the UE; only the number of antenna ports configured for the UE-DL-SRS is needed.

After the TPs that are in close proximity to a UE have been determined approximately, a CSI measurement and feedback request can be sent to the UE followed by a UE-DL-SRS transmission over one or multiple of the TPs for DL CSI measurement and feedback for the TP or TPs. Using UE3 510*c* in FIG. 5 as an example, the macro-eNB 110 may have determined that the macro-eNB 110, RRH2 120*c*, and RRH3

120*d* are in close proximity to the UE 510*c*, and the macro-eNB 110 may thus be interested in the DL CSI from those TPs.

In one scenario, this can be done by sending three CSI requests to UE 510*c*. Each request would also indicate the number of UE-DL-SRS ports that should be used by UE 510*c* for the CSI measurement and feedback. For example, for CSI measurement and feedback for the macro-eNB 110 in FIG. 5, a four-port CSI feedback request could be sent and a four-port UE-DL-SRS would be transmitted for the macro-eNB 110. Similarly, for CSI measurement and feedback for RRH#2 120*c*, a two-port CSI feedback request could be sent and a two-port UE-DL-SRS would be transmitted for RRH#2 120*c*. By requesting CSI reports with different numbers of UE-DL-SRS ports and receiving the UE-DL-SRS over the corresponding TPs, the macro-eNB 110 can obtain the DL CSI about the TPs close to UE 510*c*.

In another scenario, a joint DL CSI feedback for multiple TPs could be done. For example, a joint DL CSI feedback from UE 510*c* for RRH#2 120*c* and RRH#3 120*d* in FIG. 5 could be done by sending a four-port CSI request and transmitting a four-port UE-DL-SRS over the two RRHs, one UE-DL-SRS signal to each antenna port, to UE 510*c*. This would allow joint transmission of a DL PDSCH to UE 510*c* from both RRH#2 120*c* and RRH#3 120*d*. Similarly, joint DL CSI feedback from UE 510*c* for RRH#2 120*c*, RRH#3 120*d*, and the macro-eNB 110 in FIG. 5 could be done by sending an eight-port CSI request and transmitting an eight-port UE-DL-SRS over the two RRHs 120*c* and 120*d* and the macro-eNB 110. This would allow joint transmission of a DL PDSCH to UE 510*c* from all the three TPs.

Alternatively, multiple UE-DL-SRS reference signals with orthogonal resources could be transmitted simultaneously from multiple TPs, one from each TP, in the same subframe, and a UE may be requested to measure and feed back DL CSI for each individual TP and/or joint DL CSI for multiple TPs.

Figures 8, 9:
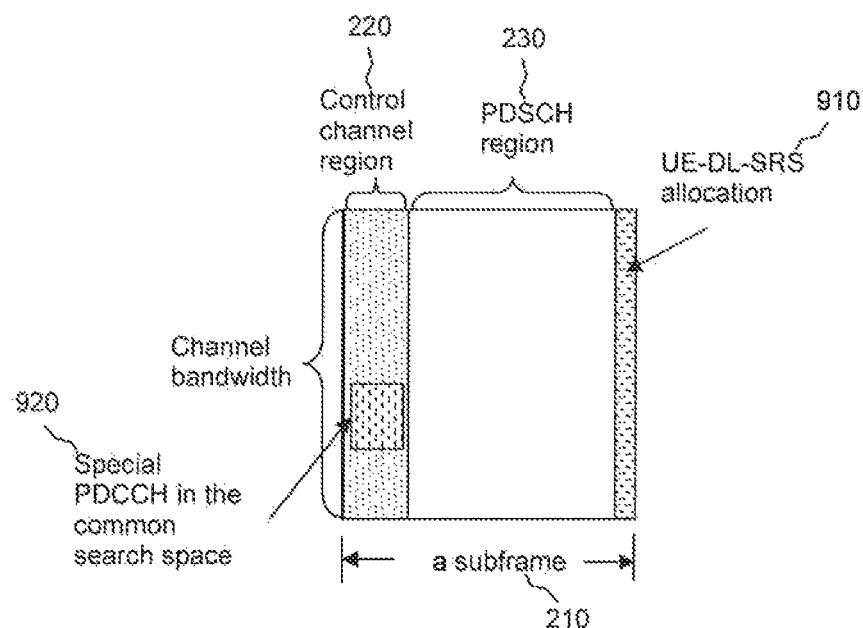
FIG. 8 is a diagram of an example of cycling through a predetermined set of precoding vectors, according to an embodiment of the disclosure.
FIG. 9 is a diagram of an example of UE-DL-SRS resource allocation in a subframe, according to an embodiment of the disclosure.

The frequency and time resources for the UE-DL-SRS could be divided into cell-specific resources and UE-specific resources. Cell-specific UE-DL-SRS resources may be shared by multiple antenna ports and multiple UEs in a cell. One example of UE-DL-SRS resource allocation in a subframe is shown in FIG. 9, where the last symbol 910 is allocated for the UE-DL-SRS. Alternatively, any symbol or symbols in the PDSCH region of a subframe could be allocated for this purpose. In addition, either all or part of the frequency resources in the symbol may be allocated to the UE-DL-SRS. The existence of the UE-DL-SRS symbol in a subframe may be either semi-statically configured or dynamically indicated with a special grant as conceptually shown in FIG. 9. Here, dynamic indication is assumed and is done by sending a special PDCCH 920 in the common search space in a subframe 210. When a UE receives the special PDCCH 920 in the common search space, the UE can assume that the UE-DL-SRS will be present in the subframe 210. Frequency resources configured for the UE-DL-SRS in a subframe should typically not be used for DL PDSCH transmission for legacy UEs. For PDSCH transmission to advanced UEs, the REs configured for the UE-DL-SRS could be considered reserved and might not be used for PDSCH transmission.

UE-specific resources are a subset of the cell-specific resources. A UE's UE-specific resources can be configured semi-statically in the time, frequency, or code domain or in a combination of these domains. For an aperiodic UE-DL-SRS, multiple sets of resources, including the number of UE-DL-SRS ports, may be semi-statically configured, and a UE may be dynamically requested by the macro-eNB through the PDCCH to measure and feed back DL channel information using either one set of configurations at a time or multiple sets of configurations at a time.

Each set of UE-DL-SRS configurations may include the number of UE-DL-SRS ports, e.g., {1,2,4,8}; the frequency domain locations, such as starting frequency and bandwidth; the time domain locations, such as subframes; the periodicity and subframe offset; the code sequences, such as cyclic shifts of a predefined or semi-statically configured base sequence; and/or the UE-DL-SRS to PDSCH power ratio.

As mentioned previously, two general solutions are provided herein for the second problem. The above discussion has dealt with the first solution, and the discussion now turns to the second solution. In this second solution, a method of CSI-RS configuration enhancement to allow DL CSI measurement and feedback of a subset of TPs from a UE is provided. That is, a TP-specific CSI-RS is generated and is used by a UE to determine information about the downlink channel from a TP to the UE. The UE can then feed this information back to the macro-eNB for the cell in which the UE and the TP are located for the macro-eNB to use in determining parameters for transmissions from the TP to the UE. The feedback might be provided to the macro-eNB only for the TPs that are close to a particular UE.

A benefit of this solution is reduced CSI measurement and feedback overhead when a large number of TPs are deployed in a cell, because most of the time only a small number of TPs are close to a UE. These TP-specific reference signals for CSI feedback can be configured independently from the TP-specific or UE-specific reference signals for the PDCCH as described in regard to the first problem.

In addition, CSI-RS configuration enhancement and the corresponding signaling to allow different numbers of antennas to be deployed in different TPs are provided.

More specifically, in this second solution to the second problem, a TP-specific CSI-RS is used for TP-specific DL CSI feedback from a UE. A TP-specific CSI-RS could be based on the CSI-RS defined in Rel-10, where CSI-RSs are introduced for DL CSI measurement and feedback. The number of CSI-RS ports or signals is signaled to the UEs through RRC (Radio Resource Control) signaling, and up to eight CSI-RS ports per cell are supported. CSI-RS reference signals are periodically transmitted from a cell and are intended for all the UEs served by the cell. The periodicity, subframe offset, and time and frequency resources within a subframe are semi-statically configured.

For Rel-10 UEs configured with transmission mode 9, CRSs are not required for PDSCH demodulation due to the UE-specific DMRS introduced in Rel-10. Thus, the PDSCH can be transmitted over different antenna ports from the CRS. For a UE close to a TP, which could be determined based on UL measurements, PDSCH data for the UE could be sent via only that TP. The UE can demodulate the signal using DMRS. However, the UL channel information obtained by the macro-eNB is generally not enough for determining the proper DL transmission precoding and MCS for a UE, at least for FDD (frequency division duplex). To have precise DL channel information for transmission precoding and MCS assignment at a TP, DL CSI measurement and feedback for the TP from the UE are needed.

Figure 10:
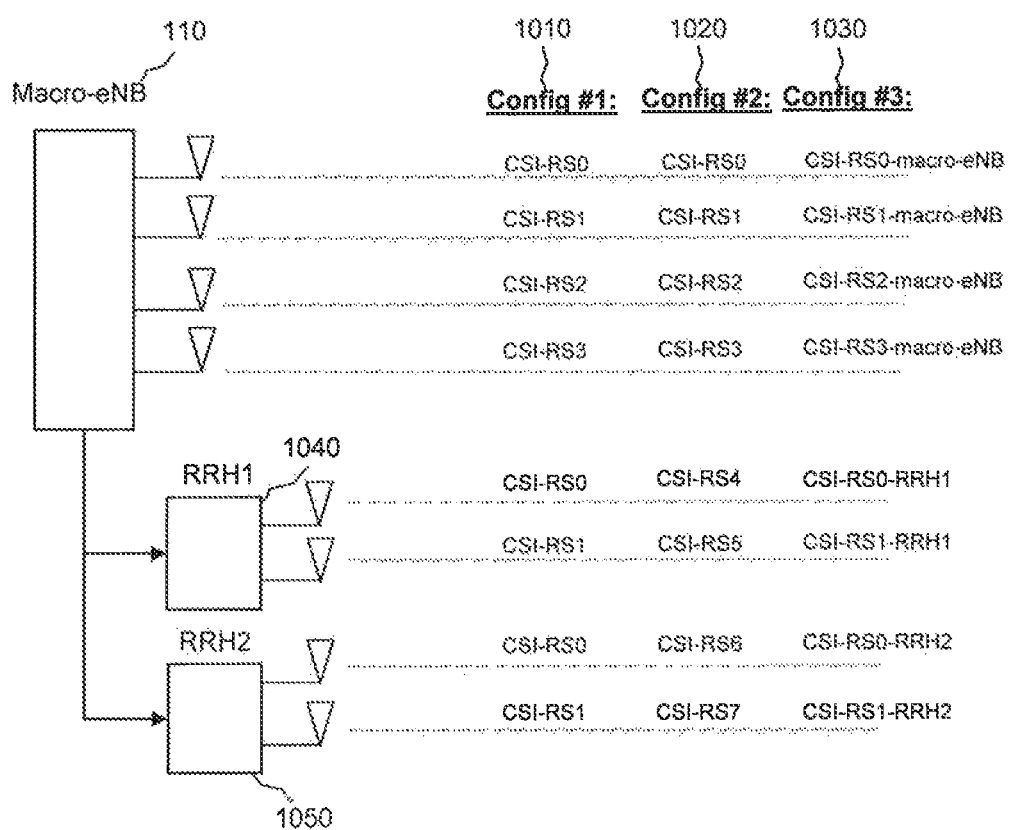
FIG. 10 is a diagram of CRS and CSI-RS configuration examples in a cell with a macro-eNB and two RRHs, according to an embodiment of the disclosure.

Three possible configuration examples for the CSI-RS in a cell with RRHs having the same cell ID as the macro-eNB are shown in FIG. 10. The configuration examples are referred to as config#1 1010, config#2 1020, and config#3 1030. In config#1 1010, the same CSI-RS signals are sent from the macro-eNB and the RRHs. For example, CSI-RS0 is transmitted from antenna port 0 of all the TPs. As a result, for antenna ports 0 and 1 in the example, composite channels are seen at a UE. So for a UE, antenna ports 0 and 1 are virtual antennas, i.e., each is a combination of antenna port 0 or antenna port 1 of all the TPs. All channels for which CRSs are needed for demodulation typically need to be transmitted over the same virtual antennas. Some enhancement for Rel-10 UEs may be achieved under this configuration due to macro diversity, but DL resources typically cannot be reused among different RRHs.

In config#2 1020, different CSI-RS ports are assigned to the RRHs, and the antenna ports in the RRHs are treated as part of the macro-eNB. A benefit of this configuration is that joint DL CSI measurement and feedback from all the TPs can be done to support joint DL PDSCH transmission. However, due to the limitation of a maximum of eight CSI-RS ports per cell defined in the Rel-10 specification, the number of RRHs that can be supported is limited. In addition, each UE typically needs to report DL CSI based on up to eight CSI-RS ports even though it may be close to only one RRH. Also, the feedback CSI does not provide the macro-eNB with information about which transmission point a UE is close to, information that could allow the PDSCH to be transmitted to a UE only from a transmission point close to the UE. Therefore, similar to config#1 1010, DL resources cannot be easily reused in different RRHs.

In config#3 1030, a unique set of CSI-RSs is assigned to each TP, either the macro-eNB or an RRH. CSI-RS resources assigned to the TPs are mutually orthogonal in either the time or the frequency domain. The CSI-RS resources typically should not be used for PDSCH transmission from any TP in the cell; i.e., PDSCH transmission is muted in the CSI-RS resources. This option is an existing solution that has previously been proposed. One of the limitations of this option is that, although different UEs may be configured with different zero and non-zero transmission power CSI-RS configurations depending on their locations, the full sets of CSI-RS configurations are the same for each UE in a cell. When a large number of TPs are deployed in a cell, a large CSI feedback overhead may be needed to support coordinated multipoint transmission with the existing Rel-10 signaling.

Using FIG. 10 as an example, the CSI-RS configurations for each UE based on Rel-10 may be the ones shown in Table 1 in FIG. 11, where CSI-RS-macro-eNB, CSI-RS-RRH1, and CSI-RS-RRH2 represent, respectively, the CSI-RS configurations in the macro-eNB 110, RRH1 1040, and RRH2 1050 for CSI-RS transmission. For a UE, its "non-zero transmission power" CSI-RS is typically configured as the CSI-RS of a TP that provides the best DL signal to the UE. With such configurations, a UE may measure and feed back either a single DL CSI based on the "non-zero transmission power" CSI-RS configuration or multiple DL CSIs based on both the "non-zero transmission power" and the "zero transmission power" CSI-RS configurations.

However, it is not always necessary for a UE to feed back DL CSIs of all the TPs in a cell. For example, for UE2 510a in FIG. 5, it is not necessary to feed back DL CSI for RRH#4 120b due to its large spatial separation from that RRH. Therefore, it is desirable for a UE to feed back only a subset of the TPs in a cell. Thus, a subset of the CSI-RS configurations may be indicated to a UE for DL CSI feedback, such as the examples shown in column 1110 in Table 2 in FIG. 11. It can be seen that CSI feedback is not provided for CSI-RS-RRH2 for UE2 or for CSI-RS-RRH1 for UE3, but is provided in the other instances. Such configurations may be done either semi-statically through higher layer signaling or dynamically on a per-request basis.

Another limitation with the Rel-10 CSI-RS configuration is that the same number of CSI-RS ports are assumed for all the CSI-RS configurations for a UE. To support deployment of RRHs with different numbers of CSI-RS ports, each CSI-RS configuration may be also accompanied with the number of CSI-RS ports, as shown in column 1120 in Table 2 in FIG. 11.

In addition, feedback of joint DL CSI from more than one TP may also be desirable to support joint transmission from more than one TP to a UE. For example, DL joint CSI feedback for RRH1 1040 and RRH2 1050 in FIG. 10 may be done by a UE by assuming a joint four-port transmission from the two RRHs. This could be beneficial when a UE is not close to either of the RRHs and joint PDSCH transmission from the two RRHs could provide better macro-diversity (and thus better DL signal quality and data throughput) for the UE. This joint CSI feedback could be signaled to a UE either semi-statically or dynamically.

The DL CSI feedback based on the CSI-RS configurations could be done either periodically or aperiodically. In the case of periodic feedback of multiple DL CSIs, the DL CSI for a TP could be implicitly identified by the location of the feedback resources in either the time or frequency domain. Alternatively, the DL CSI for a TP could be explicitly encoded together with the DL CSI feedback.

In the case of aperiodic feedback, a feedback request could be sent dynamically through a PDCCH channel. The TP or TPs for which DL CSI feedback is requested could be signaled together with the request.

For a cell with a number of RRHs sharing the same cell ID as the macro-eNB, the macro-eNB may need to determine the best TPs for DL data transmissions to a UE. The set of TPs that may participate in DL coordinated data transmissions to a UE may be referred to herein as the DL CoMP set. When a large number of TPs are deployed in a cell, measuring and feeding back DL CSI for every TP from a UE could add a large feedback overhead in the UL. Therefore, it may be desirable to measure CSI only for a subset of the TPs that are in the close proximity to a UE. This subset of TPs comprises the DL CSI measurement set for a UE. The DL CoMP set is typically a subset of the measurement set.

The initial DL measurement set for a UE could be based on the measurement of UL signals received at all the TPs from a UE. The UL signals could include signals such as PRACH (physical random access channel), SRS (sounding reference signal), PUCCH (physical uplink control channel), and PUSCH (physical uplink shared channel). It can be assumed that the macro-eNB is fully visible to the signals received from all TPs in a cell and that the macro-eNB can measure and process UL received signals from each TP individually or from multiple TPs jointly.

After a UL signal is transmitted from a UE, the macro-eNB could measure the strength of the received signal at each TP and estimate the DL signal strength at the UE from each TP based on the UL received signal strength and the transmit power of each TP. This information can be used by the macro-eNB to determine the candidate TPs for DL CSI measurement by the UE. That is, the initial DL measurement set is determined. This initial measurement set could be updated periodically based on the received UL signals from the UE.

After the initial measurement set has been determined, a UE could be configured with the proper CSI-RS or UE-CSI-RS and could be requested to provide a DL CSI measurement and feedback. The UE could be configured or signaled to measure the DL CSI for each TP in the measurement set individually. The UE could also be configured or signaled to measure and feed back a joint DL CSI for multiple TPs in the measurement set. The CSI feedback could then be used by the macro-eNB to determine the DL CoMP set for the UE.

FIG. 12 is a flowchart illustrating a method for transmitting control information in a telecommunications cell. At block 1210, a transmission point in the cell transmits a unicast PDCCH intended only for a specific UE in the cell. The unicast PDCCH contains at least one resource element in each resource element group. At least one resource element contains a UE-specific DMRS that can be used for decoding the unicast PDCCH without the cell-specific reference signal.

Figure 13:
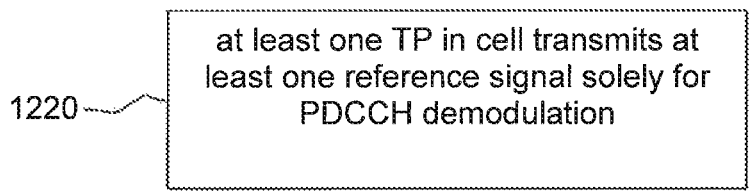
FIG. 13 illustrates a method for transmitting control information in a telecommunications cell, according to another embodiment of the disclosure.

FIG. 13 is a flowchart illustrating a method for transmitting control information in a telecommunications cell. At block 1220, at least one TP in the cell transmits at least one reference signal solely for PDCCH demodulation.

Figure 14:
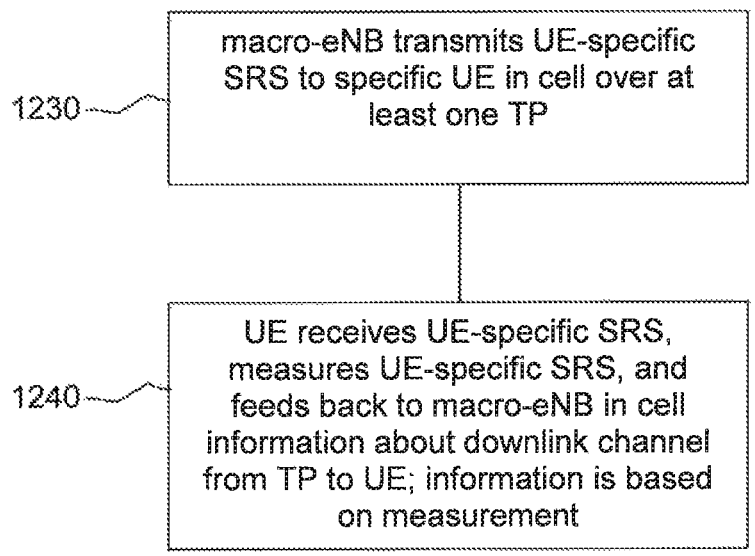
FIG. 14 illustrates a method for communication in a telecommunications cell, according to an embodiment of the disclosure.

FIG. 14 is a flowchart illustrating a method for communication in a telecommunications cell. At block 1230, a macro-eNB transmits a UE-specific SRS to a specific UE in the cell over at least one TP. At block 1240, the UE receives the UE-specific SRS, measures the UE-specific SRS, and feeds back to a macro-eNB in the cell information about a downlink channel from the TP to the UE. The information is based on the measurement.

Figure 15:
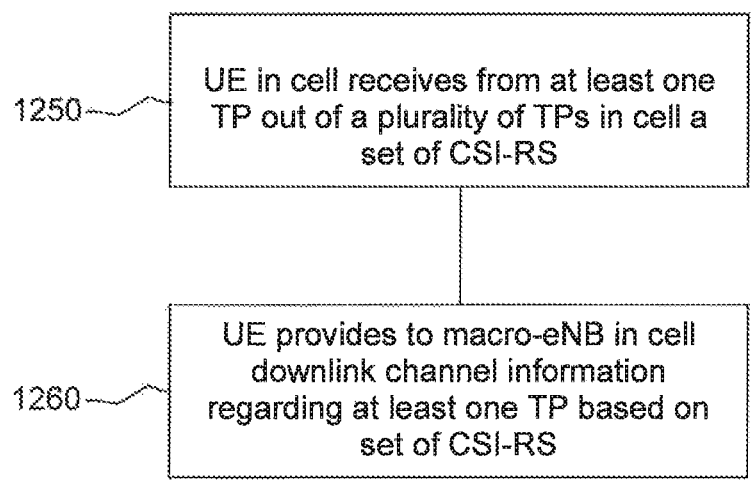
FIG. 15 illustrates a method for communication in a telecommunications cell, according to an embodiment of the disclosure.

FIG. 15 is a flowchart illustrating a method for communication in a telecommunications cell. At block 1250, a UE in the cell receives from at least one TP out of a plurality of TPs in the cell a set of CSI-RS. Each TP has a unique set of CSI-RS. At block 1260, the UE provides to a macro-eNB in the cell downlink channel information regarding at least one of the TPs based on the set of CSI-RS.

Figure 16:
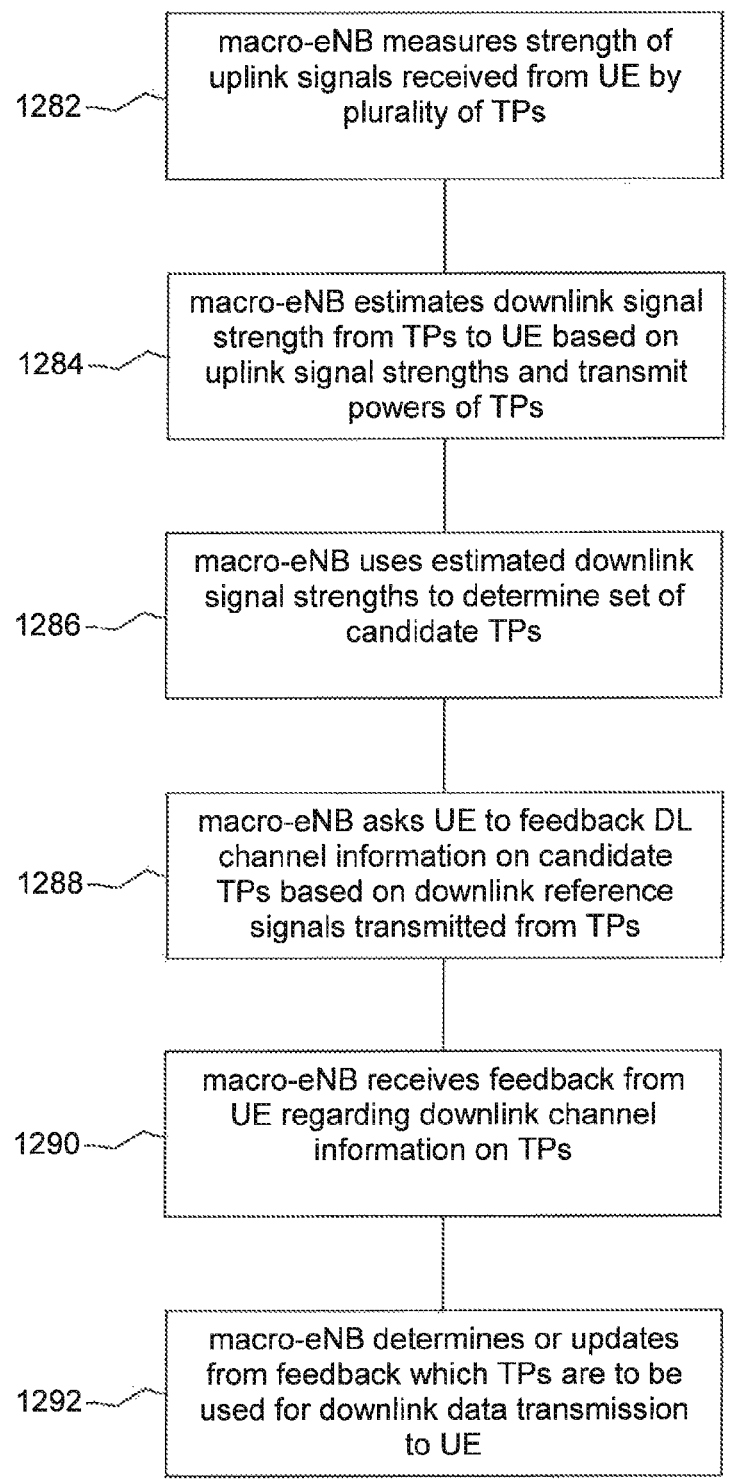
FIG. 16 illustrates a method for determining which transmission points are to be used for downlink data transmission to a user equipment, according to an embodiment of the disclosure.

FIG. 16 is a flowchart illustrating a method for determining which TPs are to be used for downlink data transmission to a UE. At block 1282, a macro-eNB measures the strength of uplink signals received from the UE by a plurality of TPs. At block 1284, the macro-eNB estimates a downlink signal strength from each of the plurality of TPs to the UE based on the uplink signal strengths and the transmit powers of the plurality of TPs. At block 1286, the macro-eNB uses the estimated downlink signal strengths to determine a set of candidate TPs. At block 1288, the macro-eNB requests the UE to feedback downlink channel information on each of the candidate TPs based on downlink reference signals transmitted from the TPs. At block 1290, the macro-eNB receives feedback from the UE regarding downlink channel information on the TPs. At block 1292, the macro-eNB determines or updates from the feedback which TPs are to be used for downlink data transmission to the UE.

In summary, the first solution to the first problem allows a PDCCH to be transmitted from an individual TP or a group of TPs to a UE, and thus the same resources may be reused in other TPs for increased PDCCH capacity. There is minimum change to existing specifications, and this solution is fully backward compatible.

The second solution to the first problem might use less overhead for reference signals and yet still allows PDCCH transmission from an individual TP. But in this solution, the TPs are not transparent to UEs, and some TP association to a UE may need to be performed.

In the first solution to the second problem, the UE-DL-SRS allows DL CSI feedback for an individual TP or a group of TPs from a UE to support PDSCH transmission from a selected TP or TPs to provide the best DL signal quality as well as increased system capacity through reuse of the same resources in different TPs. The presence of TPs in a cell is transparent to a UE, and hand-off is not needed when a UE moves from one TP to another TP in a cell.

The second solution to the second problem modifies the Rel-10 CSI-RS for CSI feedback of an individual TP from a UE. This solution may be less flexible compared to the first solution to the second problem but entails fewer changes to the LTE specifications.

Figure 17:
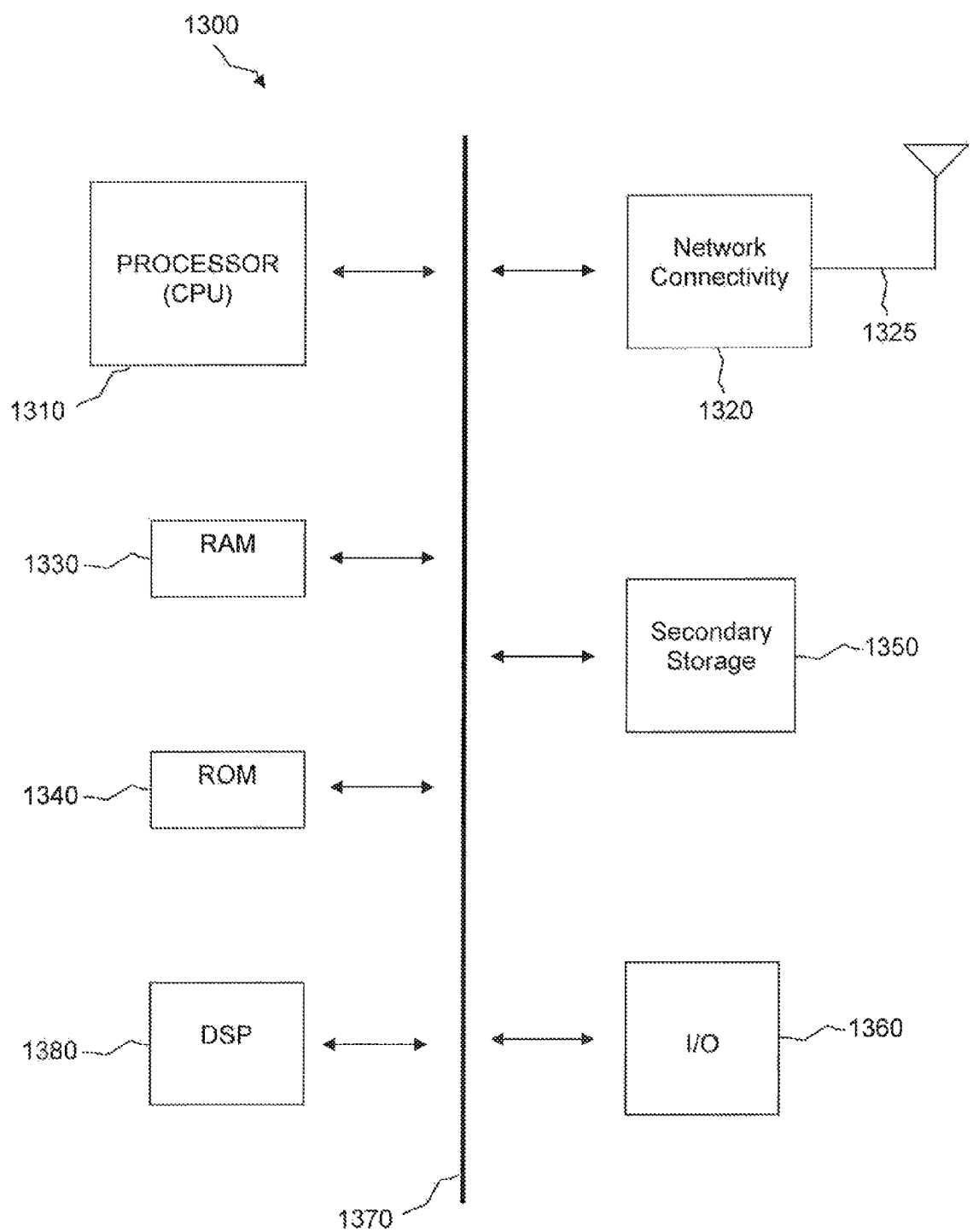
FIG. 17 illustrates a processor and related components suitable for implementing the several embodiments of the present disclosure.

The UE and other components described above might include a processing component that is capable of executing instructions related to the actions described above. FIG. 17 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method is provided for transmitting control information in a telecommunications cell. The method comprises a transmission point in the cell transmitting a unicast PDCCH intended only for a specific UE in the cell. The unicast PDCCH contains at least one resource element in each resource element group. At least one resource element contains a UE-specific DMRS that can be used for decoding the unicast PDCCH without the cell-specific reference signal.

In another embodiment, a TP in a telecommunications cell is provided. The TP includes a processor configured such that the transmission point transmits a unicast PDCCH intended only for a specific UE in the cell. The unicast PDCCH contains at least one resource element in each resource element group. At least one resource element contains a UE-specific DMRS that can be used for decoding the unicast PDCCH without the cell-specific reference signal.

In another embodiment, a UE is provided. The UE includes a processor configured such that the UE receives a unicast PDCCH that contains at least one resource element in each resource element group. The at least one resource element contains a UE-specific DMRS that the UE can use to decode the unicast PDCCH without the cell-specific reference signal.

In another embodiment, a method is provided for transmitting control information in a telecommunications cell. The method comprises at least one TP in the cell transmitting at least one reference signal solely for PDCCH demodulation.

In another embodiment, a TP in a telecommunications cell is provided. The TP includes a processor configured such that the TP transmits at least one reference signal solely for PDCCH demodulation.

In another embodiment, a UE is provided. The UE includes a processor configured such that the UE receives from a TP in the same cell as the UE at least one reference signal solely for PDCCH demodulation.

The following are incorporated herein by reference for all purposes: 3GPP Technical Specification (TS) 36.211 and 3GPP TS 36.213.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for transmitting control information in a telecommunications cell, comprising:
   a subset of transmission points of a set of transmission points associated with an eNodeB (eNB) in the cell transmitting a unicast physical downlink control channel (PDCCH) intended only for a specific user equipment (UE) in the cell,
   wherein the unicast PDCCH contains at least one resource element in each resource element group, and
   wherein at least one resource element contains a UE-specific demodulation reference signal (DMRS) that can be used for decoding the unicast PDCCH, and
   wherein the decoding occurs without the use of a cell-specific reference signal broadcast by the eNB, and
   wherein a remainder of the set of transmission points does not transmit the unicast PDCCH.

2. The method of claim 1, wherein the at least one resource element is not allocated for the cell-specific reference signal being broadcast in the cell.

3. The method of claim 1, wherein the UE-specific DMRS is a sequence of symbols carrying a bit sequence that allows the specific UE to decode the unicast PDCCH correctly.

4. The method of claim 1, wherein the UE-specific DMRS is derived from at least one of:
   a radio network temporary identifier assigned to the specific UE;
   an identifier for the cell; and
   a subframe index.

5. The method of claim 1, wherein a beam forming type of precoded transmission is used for the unicast PDCCH, and wherein the PDCCH is weighted and transmitted from a plurality of antenna ports such that signals from the plurality of antenna ports are coherently combined at the specific UE.

6. The method of claim 5, wherein a precoding vector for the precoded transmission is obtained from at least one of:
   feedback from the specific UE regarding at least one downlink wideband channel;
   and an uplink channel measurement based on channel reciprocity.

7. The method of claim 6, wherein a set of precoding vectors is predefined, and wherein each resource element group of the unicast PDCCH is precoded with one of the precoding vectors.

8. The method of claim 7, wherein a mapping from precoding vector to resource element group is performed in a cyclic manner.

9. A transmission point (TP) in a telecommunications cell, comprising:
   a processor configured such that a subset of transmission points of a set of transmission points associated with an eNodeB (eNB) transmits a unicast physical downlink control channel (PDCCH) intended only for a specific user equipment (UE) in the cell,
   wherein the unicast PDCCH contains at least one resource element in each resource element group, and
   wherein at least one resource element containing a UE-specific demodulation reference signal (DMRS) that can be used for decoding the unicast PDCCH, and
   wherein the decoding occurs without the use of a cell-specific reference signal broadcast by the eNB, and wherein a remainder of the set of transmission points does not transmit the unicast PDCCH.

10. The TP of claim 9, wherein the at least one resource element is not allocated for the cell-specific reference signal being broadcast in the cell.

11. The TP of claim 9, wherein the UE-specific DMRS is a sequence of symbols carrying a bit sequence that allows the specific UE to decode the unicast PDCCH correctly.

12. The TP of claim 9, wherein the UE-specific DMRS is derived from at least one of:
   a radio network temporary identifier assigned to the specific UE;
   an identifier for the cell; and
   a subframe index.

13. The TP of claim 9, wherein a beamforming type of precoded transmission is used for the unicast PDCCH, and wherein the PDCCH is weighted and transmitted from a plurality of antenna ports such that signals from the plurality of antenna ports are coherently combined at the specific UE.

14. The TP of claim 13, wherein a precoding vector for the precoded transmission is obtained from at least one of:
   feedback from the specific UE regarding at least one downlink wideband channel;
   and an uplink channel measurement based on channel reciprocity.

15. The TP of claim 14, wherein a set of precoding vectors is predefined, and wherein each resource element group of the unicast PDCCH is precoded with one of the precoding vectors.

16. The TP of claim 15, wherein a mapping from precoding vector to resource element group is performed in a cyclic manner.

17. A user equipment (UE), comprising:
   a processor configured such that:
   the UE receives a unicast physical downlink control channel (PDCCH) from a subset of transmission points of a set of transmission points associated with an eNodeB (eNB) that contains at least one resource element in each resource element group,
   wherein the at least one resource element contains a UE-specific demodulation reference signal (DMRS) that the UE can use to decode the unicast PDCCH, and
   wherein the UE performs the decoding without the use of a cell-specific reference signal broadcast by the eNB, and
   wherein the UE does not receive the unicast PDCCH from a remainder of the set of transmission points.

18. The UE of claim 17, wherein the at least one resource element is not allocated for the cell-specific reference signal.

19. The UE of claim 17, wherein the UE-specific DMRS is a sequence of symbols carrying a bit sequence that allows the specific UE to decode the unicast PDCCH correctly.

20. The UE of claim 17, wherein the UE-specific DMRS is derived from at least one of:
   a radio network temporary identifier assigned to the specific UE;
   an identifier for the cell; and
   a subframe index.

* * * * *